United States Patent
Ellis

(10) Patent No.: US 11,132,641 B2
(45) Date of Patent: Sep. 28, 2021

(54) RFID INVENTORY SYSTEM AND METHOD

(71) Applicant: Robert Marshall Ellis, Shady Shores, TX (US)

(72) Inventor: Robert Marshall Ellis, Shady Shores, TX (US)

(*) Notice: Subject to any disclaimer, the term of this patent is extended or adjusted under 35 U.S.C. 154(b) by 0 days.

(21) Appl. No.: 16/908,944

(22) Filed: Jun. 23, 2020

(65) Prior Publication Data
US 2020/0320476 A1 Oct. 8, 2020

Related U.S. Application Data

(63) Continuation-in-part of application No. 16/177,696, filed on Nov. 1, 2018, now abandoned.

(60) Provisional application No. 62/723,104, filed on Aug. 27, 2018.

(51) Int. Cl.
G06Q 30/00 (2012.01)
G06Q 90/00 (2006.01)
G06Q 10/08 (2012.01)
G06K 7/00 (2006.01)
G07G 1/00 (2006.01)
G06K 17/00 (2006.01)
G06K 7/10 (2006.01)

(52) U.S. Cl.
CPC ....... G06Q 10/0875 (2013.01); G06K 7/0008 (2013.01); G06K 7/10366 (2013.01); G06K 17/0022 (2013.01); G07G 1/009 (2013.01)

(58) Field of Classification Search
CPC ............. G06Q 10/0875; G06Q 20/208; G06Q 20/203; G06K 7/0008; G06K 17/0022; G06K 7/10366; G07G 1/009
USPC ................................................ 235/383, 385
See application file for complete search history.

(56) References Cited

U.S. PATENT DOCUMENTS

| | | | |
|---|---|---|---|
| 6,611,198 B1 * | 8/2003 | Geiszler | G06K 7/0008 340/10.1 |
| 7,916,028 B2 | 3/2011 | Oberle | |
| 8,159,345 B2 | 4/2012 | Stevens | |
| 8,502,674 B1 | 8/2013 | Cole | |
| 9,342,810 B2 | 5/2016 | Vargas | |
| 9,938,693 B1 | 4/2018 | Reed | |
| 2002/0180588 A1 * | 12/2002 | Erickson | G06K 19/07796 340/10.2 |
| 2006/0186994 A1 * | 8/2006 | Lin | G08B 13/2417 340/5.74 |
| 2009/0231135 A1 | 9/2009 | Chaves | |
| 2009/0243856 A1 | 10/2009 | Lee | |
| 2010/0164694 A1 | 7/2010 | Matsubara | |
| 2012/0062382 A1 * | 3/2012 | Taneff | G08B 21/245 340/573.1 |
| 2012/0161967 A1 | 6/2012 | Stern | |

* cited by examiner

Primary Examiner — Tuyen K Vo
(74) Attorney, Agent, or Firm — Kevin Mark Klughart

(57) ABSTRACT

A radio frequency identification (RFID) inventory system/method allowing identification and categorization of radio frequency identification tags (RFIT) is disclosed. The system/method locates a master RFIT (RFIM) within a selected RFID area/cell (RFAC) using a RFID scanner (RFSC) and uses this RFIM to determine a RFIT candidate list (RFCL) that should be located within the RFAC. This RFCL is then compared against scanned RFIT (RFIS) within the RFAC and the RFIS are then categorized as READ, MISSING, WRONG, DIRTY, READ DURATION EXPIRED, or TARGETED PROXIMITY SEARCH. Once RFIS scanning is complete within the selected RFAC, a list of READ, MISSING, WRONG, and DIRTY RFIT are transmitted to an inventory compute server (ICS) to generate an inventory status report (ISR) detailing the RFIT inventory status of the selected RFAC.

20 Claims, 32 Drawing Sheets

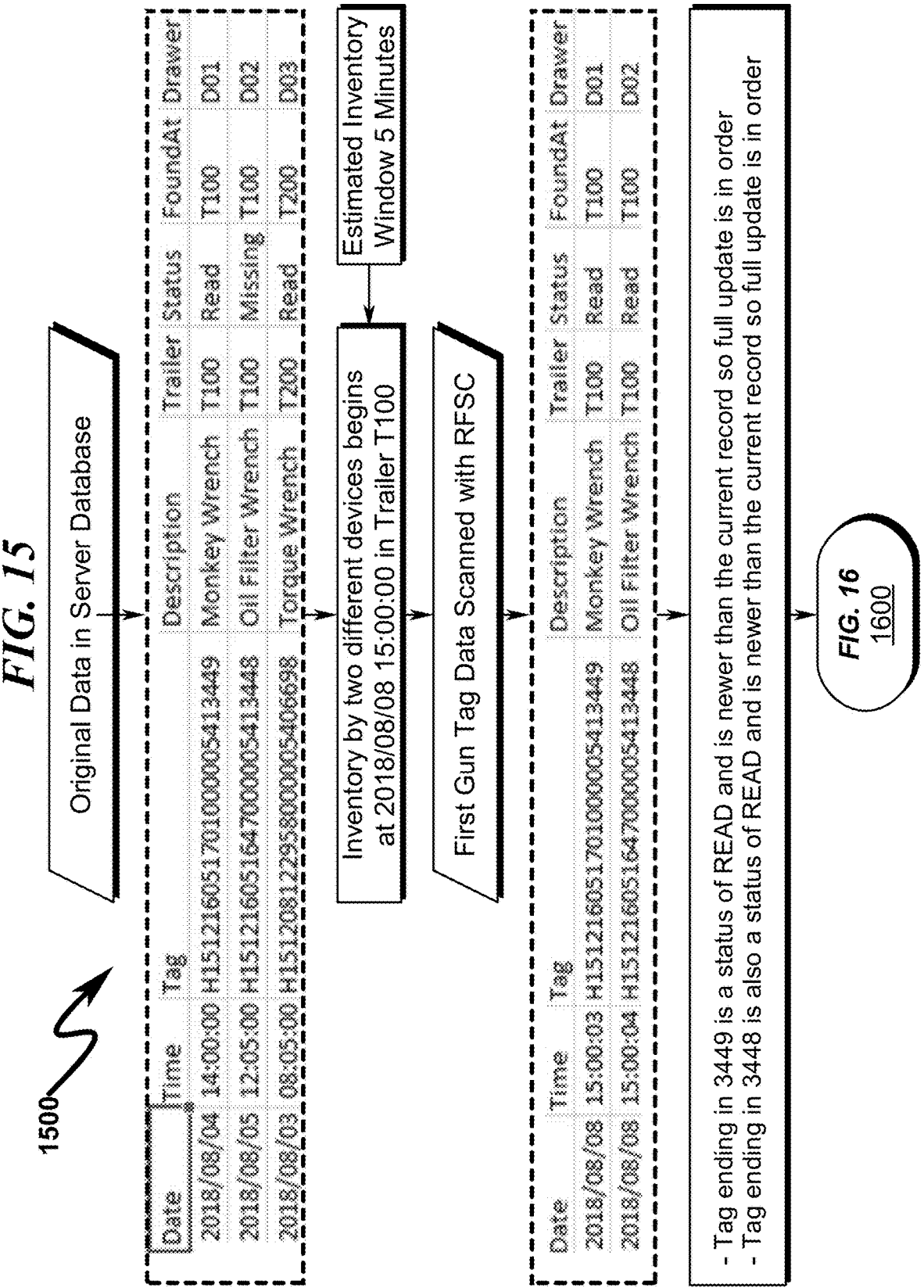

Second Gun Tag Data Scanned with RFSC

| Date | Time | Tag | Description | Trailer | Status | FoundAt | Drawer |
|---|---|---|---|---|---|---|---|
| 2018/08/08 | 15:00:20 | H15121605170100000005413449 | Monkey Wrench | T100 | Read | T100 | D001 |
| 2018/08/08 | 15:00:10 | H15121605164700000005413448 | Oil Filter Wrench | T100 | Missing | T100 | D002 |
| 2018/08/08 | 15:00:12 | H15120812295800000005408698 | Torque Wrench | T200 | Wrong | T100 | D003 |
| 2018/08/06 | 15:00:08 | H00000000000000000000001238025 | NA | NA | Read | NA | NA |

- Tag ending in 3449 is a status of READ and is newer than the current record so full update is in order
- Tag ending in 3448 is a status of MISSING and is newer than current record BUT current record status is READ and time within ESTIMATED INVENTORY WINDOW -> NO UPDATE. Note DATE/TIME can be updated as keep warm.
- Tag ending in 6698 status is WRONG and is newer than current record BUT it is located in the wrong area/cell (T100) and should be T200. Update is in order along with updated FOUND AS field.
- Tag ending in 8025 is not in system and is DIRTY. This tag can be ignored or inserted with default data.

```
System Activity Log          Tags read this session: 3
2020-06-15 16:10:50 Controller config is up to date!

2020-06-15 16:10:49 Posted OK!
2020-06-15 16:10:49 2020/06/15,16:10:49,01238025,1973,Angus,Young,OK,Plant,P2-Gate-03-IN
2020-06-15 16:10:49 P2-Gate-03-IN Posting RFID_Gate_IN...

2020-06-15 16:10:49 Device Before Submit SCRIPT TRACE:
2020-06-15 16:10:49 if OK = OK IFSTATUS:True EXEResult:(1) Msg:
2020-06-15 16:10:49 showform good.html maximize 1 EXEResult:(1) Msg:
2020-06-15 16:10:49 gpioout 1 ON 2000 EXEResult:(255) Msg:

2020-06-15 16:10:49 Reader->P2-Gate-03-IN TAG->00000000000000001238025

2020-06-15 16:10:36 Device Idle SCRIPT TRACE:
2020-06-15 16:10:36 showform hide EXEResult:(1) Msg:

2020-06-15 16:10:36 Running Device Idle Script for P2-Gate-03-IN 2020-06-15 16:10:29 Posted OK!
2020-06-15 16:10:29 2020/06/15,16:10:28,01238025,1973,Angus,Young,OK,Plant,P2-Gate-03-IN
2020-06-15 16:10:28 P2-Gate-03-IN Posting RFID_Gate_IN...

2020-06-15 16:10:28 Device Before Submit SCRIPT TRACE:
2020-06-15 16:10:28 if OK = OK IFSTATUS:True EXEResult:(1) Msg:
2020-06-15 16:10:28 showform good.html maximize 1 EXEResult:(1) Msg:
2020-06-15 16:10:28 gpioout 1 ON 2000 EXEResult:(255) Msg:

2020-06-15 16:10:28 Reader->P2-Gate-03-IN TAG->00000000000000001238025

2020-06-15 16:10:04 Device Idle SCRIPT TRACE:
2020-06-15 16:10:04 showform hide EXEResult:(1) Msg:

2020-06-15 16:10:04 Running Device Idle Script for P2-Gate-03-IN 2020-06-15 16:09:57 Posted OK!
2020-06-15 16:09:57 2020/06/15,16:09:56,01238025,1973,Angus,Young,OK,Plant,P2-Gate-03-IN
2020-06-15 16:09:57 P2-Gate-03-IN Posting RFID_Gate_IN...

2020-06-15 16:09:57 Device Before Submit SCRIPT TRACE:
2020-06-15 16:09:57 if OK = OK IFSTATUS:True EXEResult:(1) Msg:
2020-06-15 16:09:57 showform good.html maximize 1 EXEResult:(1) Msg:
2020-06-15 16:09:57 gpioout 1 ON 2000 EXEResult:(255) Msg:

2020-06-15 16:09:56 Reader->P2-Gate-03-IN TAG->00000000000000001238025
2020-06-15 16:09:50 1 reader(s) started
2020-06-15 16:09:50 P2-Gate-03-IN PING OK!
2020-06-15 16:09:50 Starting P2-Gate-03-IN
```

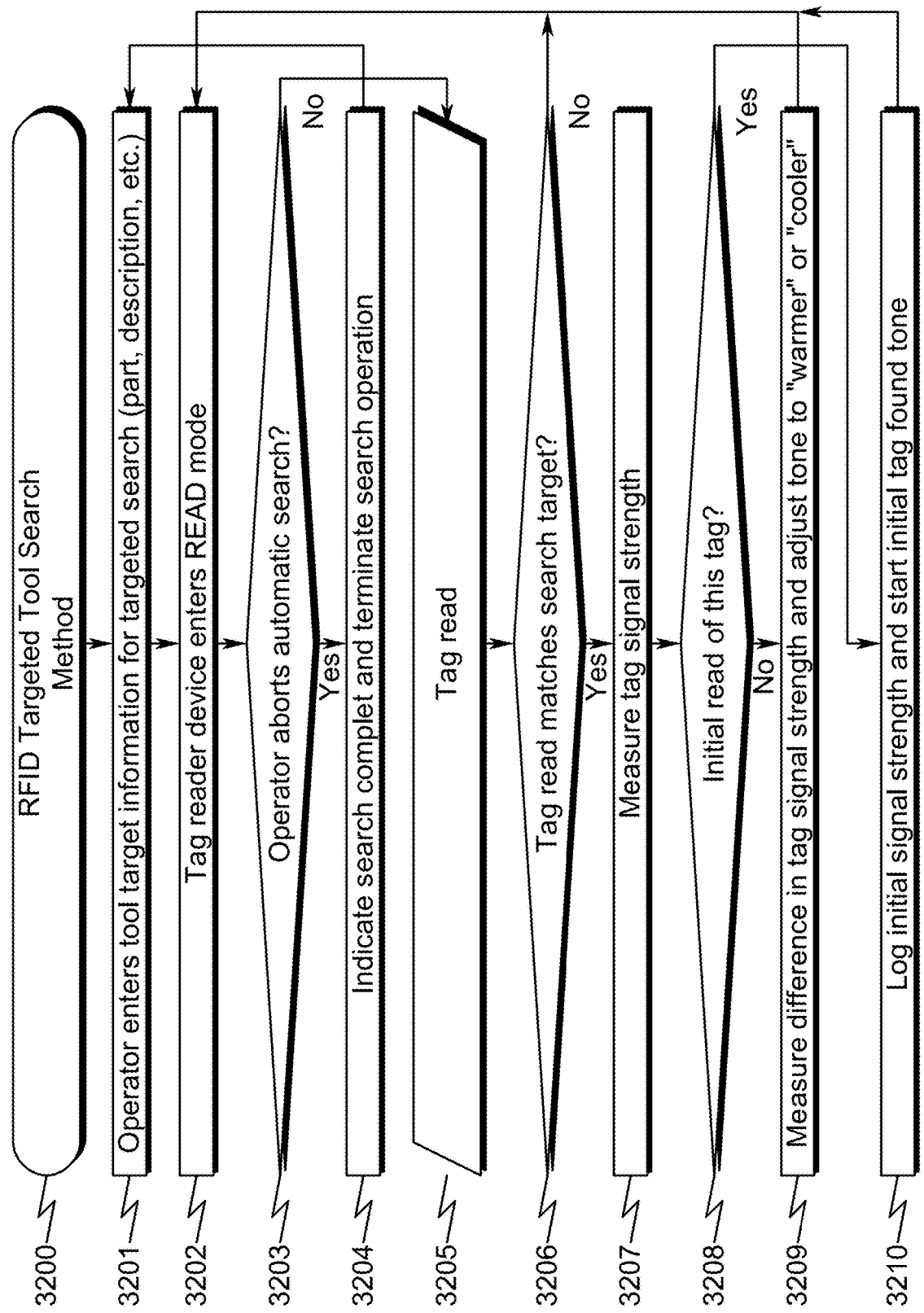

RFID INVENTORY SYSTEM AND METHOD

CROSS REFERENCE TO RELATED APPLICATIONS

Continuation-In-Part Patent Application

This patent application is a Continuation-In-Part (CIP) of and incorporates by reference United States Patent application for RFID INVENTORY SYSTEM AND METHOD by inventor Robert Marshall Ellis, filed electronically with the USPTO on 1 Nov. 2018, with Ser. No. 16/177,696, EFS ID 34184423, confirmation number 3352.

Utility Patent Applications

This patent application claims benefit under 35 U.S.C. § 120 and incorporates by reference United States Patent application for RFID INVENTORY SYSTEM AND METHOD by inventor Robert Marshall Ellis, filed electronically with the USPTO on 1 Nov. 2018, with Ser. No. 16/177,696, EFS ID 34184423, confirmation number 3352.

Provisional Patent Applications

United States Patent application for RFID INVENTORY SYSTEM AND METHOD by inventor Robert Marshall Ellis, filed electronically with the USPTO on 1 Nov. 2018, with Ser. No. 16/177,696, EFS ID 34184423, confirmation number 3352, claims benefit under 35 U.S.C. § 119 and incorporates by reference United States Provisional Patent Application for RFID INVENTORY SYSTEM AND METHOD by inventor Robert Marshall Ellis, filed electronically with the USPTO on 27 Aug. 2018, with Ser. No. 62/723,104, EFS ID 33546158, confirmation number 1445.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to the use of radio frequency identification (RFID) technology in scenarios where large inventories of product must be tracked and accounted for over temporally and spatially diverse application contexts. While not limitive of the invention scope, the present invention may be applied to industrial service companies that provide maintenance services to their customers thus forcing these service companies to procure and maintain large amounts of tools. The present invention may be applicable in the inventory management of these tools for these service companies.

BACKGROUND AND PRIOR ART

The present invention addresses inventory maintenance using RFID technology in a wide variety of application contexts. As an example of one exemplary application context, industries such as petrochemical companies use large numbers of vehicles in the field that must be serviced regularly or repaired. Either these companies or their vendors often utilize multiple trailers/trucks outfitted with tools which are needed to provide repair maintenance services to these field vehicles. When these vehicles go to a remote location to perform these services they MUST contain all tools needed to perform these services or their customer (such as the petrochemical company) cannot operate the vehicle which results in lost revenue. Commonly, a missing wrench or other hand tool can prevent tens of thousands of dollars in down time. The present invention system and method is designed to prevent this occurrence by allowing the quick counting and confirmation of tools and their locations in this particular application context. Often it is not necessarily a missing tool but the wrong tool is located in the wrong trailer. This is just as bad and often is not identified in prior art inventory control methodologies.

Prior art related to the task of inventory control using RFID technology includes but is not limited to U.S. Pat. Nos. 7,916,028; 8,159,345; 8,502,674; 9,342,810; 9,938,693; and United States Patent Application Publications 2009/0231135; 2009/0243856; 2010/0164694; and 2012/0161967.

BRIEF SUMMARY OF THE INVENTION

The present invention relates to a system and method that allows a user with a RFID capable mobile device to quickly interrogate a room/trailer/area that has a master cell/area Radio Frequency Identification (AKA RFID) tag (RFIM) and tools/items that have also been tagged with RFID tags (RFIT) and develop an up-to-date inventory list of items that were read, not read, and read when they should not have been thus allowing the mobile RFID device to build a list of items inventoried, missing, or in the wrong room/trailer/area. An expected inventory is loaded to a RFID device based on the identification of a RFID master tag (RFIM) after which begins a complete read process as the user wands/scans the RFIT device thus reading a plurality of tags which have been provisioned into the system. The end result will be a group of tags that were READ, a group that are MISSING, and a group of DIRTY tags within the area/cell identified by the RFIM. These groups are transmitted to an inventory compute server (ICS) executing a server control program (SQL, Website, etc.) which will process the inventory and update the actual inventory accordingly.

In an exemplary embodiment of the present system and method a process/system for quickly discerning between items/tools that belong (READ), are MISSING, are in the WRONG area/cell, or are DIRTY and are not in the system in any capacity is described and detailed herein.

BRIEF DESCRIPTION OF THE DRAWINGS

For a fuller understanding of the advantages provided by the invention, reference should be made to the following detailed description together with the accompanying drawings wherein:

FIG. 15 illustrates a data flow diagram depicting exemplary operation of the present invention (page 1 of 2);

FIG. 16 illustrates a data flow diagram depicting exemplary operation of the present invention (page 2 of 2);

FIG. 22 illustrates an exemplary tag read log associated with an ARL (page 2/2);

FIG. 32 illustrates a flowchart depicting a typical targeted tool search method as implemented in some preferred invention embodiments.

DESCRIPTION OF THE PRESENTLY PREFERRED EXEMPLARY EMBODIMENTS

Figure 1:
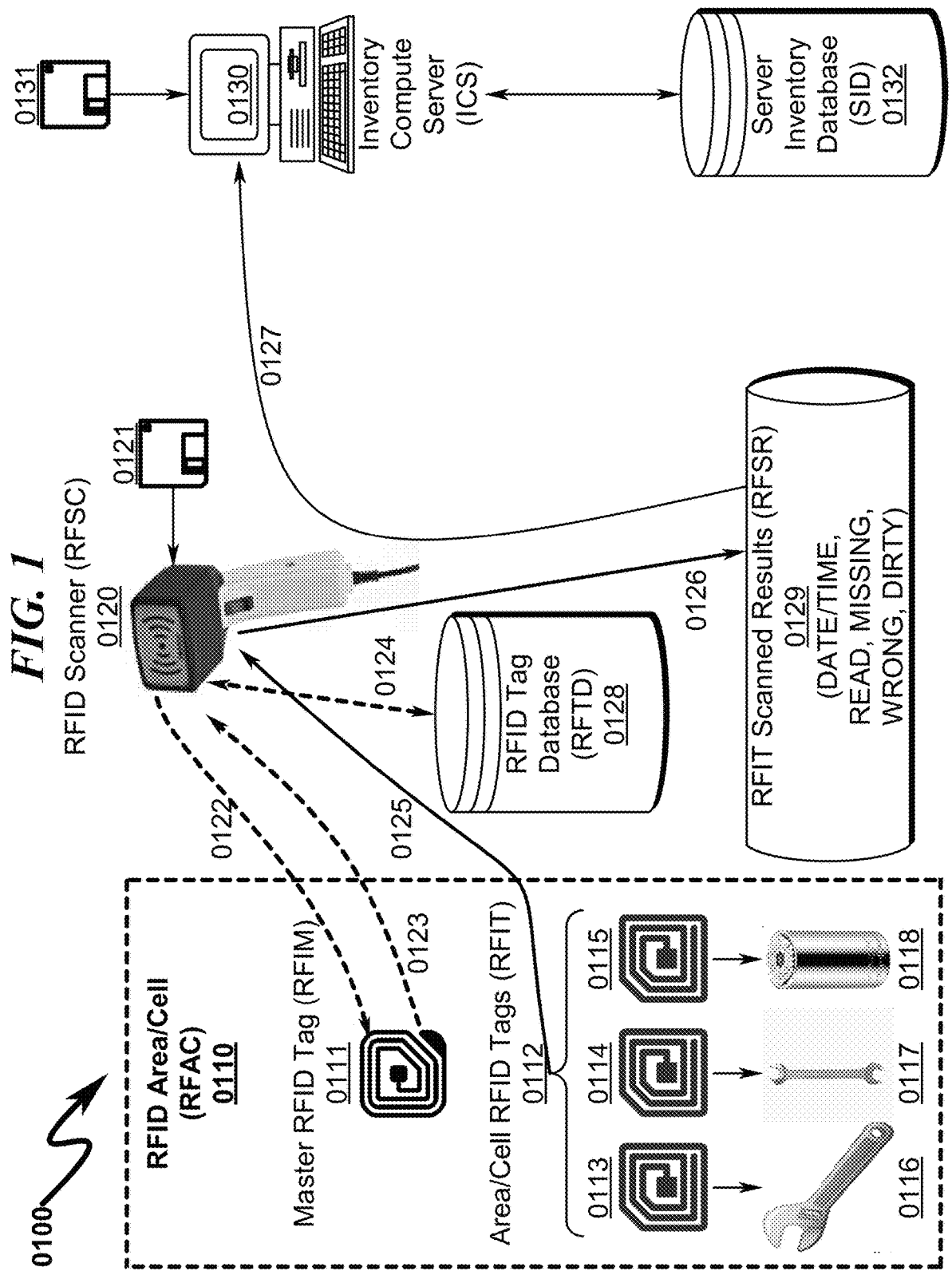
FIG. 1 illustrates a block diagram depicting a preferred exemplary invention system embodiment.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of an RFID INVENTORY SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Application Context Exemplary

The present invention may be implemented in a wide variety of application contexts. As an exemplary application context, the present invention will be described in terms of tool inventory within a number of storage trailers servicing the petrochemical oilfield industry. This application context may be generalized and applied to a wide variety of area/cell locations in which inventory control is desired. The discussed exemplary application context does not limit the scope of the claimed invention.

System Overview (0100)

A block diagram of a preferred invention system embodiment is generally depicted in FIG. 1 (0100). Here it can be seen that a RFID area/cell (RFAC) (0110) is comprised of a master RFID tag (RFIM) (0111) that is associated with one or more area/cell RFID tags (RFIT) (0112) located within the RFAC (0110). These RFIT (0112) comprise individual RFID tags (0113, 0114, 0115) that are attached to individual items (0116, 0117, 0118) that are to be inventoried within the RFAC (0110).

Within this context a RFID scanner (RFSC) (0120) executing machine instructions read from a computer readable medium (0121) is used to RF scan (0122) and interrogate (0123) the RFAC (0110) and identify the RFIM (0111). This RFIM (0111) information is then cross referenced (0124) to a RFID Tag Database (RFTD) (0128) to determine a RFID candidate list (RFCL) of potential RFIT that are associated with the particular RFAC (0110). The remaining RFIT (0112) within the RFAC (0110) are then scanned/read (0125) with the RFID scanner (0120) and as each RFIT (0113, 0114, 0115) is scanned (0125) the RFIT tag identification is compared against the RFCL from the RFID Tag Database (RFTD) (0128) and the RFIT are categorized as READ (corresponding to RFIT that are properly within the RFAC and found during the scan), MISSING (corresponding to RFIT that should be located within the selected RFAC but were not scanned), WRONG (corresponding to RFIT that were scanned in the RFAC but should be within another RFAC), or DIRTY (RFIT that are not associated with any known RFAC). This categorization status is then recorded (0126) in a RFIT scanned results database (0129) along with the date/time of the RFID scan by the RFID scanner (0120).

Subsequent to the scanning of all RFIT (0112) within the RFAC (0110), the scanned data within the RFIT scanned results database (RFSR) (0129) (a list of READ, MISSING, WRONG, and DIRTY RFIT) is transmitted (0127) to an inventory compute server (ICS) (0130) executing machine instructions read from a computer readable medium (0131) to generate an inventory status report (ISR) stored in a server inventory database (SID) (0132) detailing the RFIT inventory status of the selected RFAC.

Setup Method Overview (0200)

The present invention addresses RFID inventory control generally in a two-step process. The first step in this process is a SETUP method in which a RFIM master tag is associated with a specific area/cell and RFIT item tags are identified and associated with the RFIM. In this manner, when a RFID reader enters a particular area/cell and locates a known RFIM master tag, it can then deduce a list of RFIT item tags that should be present in the area/cell and also identify RFIT item tags that should not be present in the particular area/cell.

Figure 2:
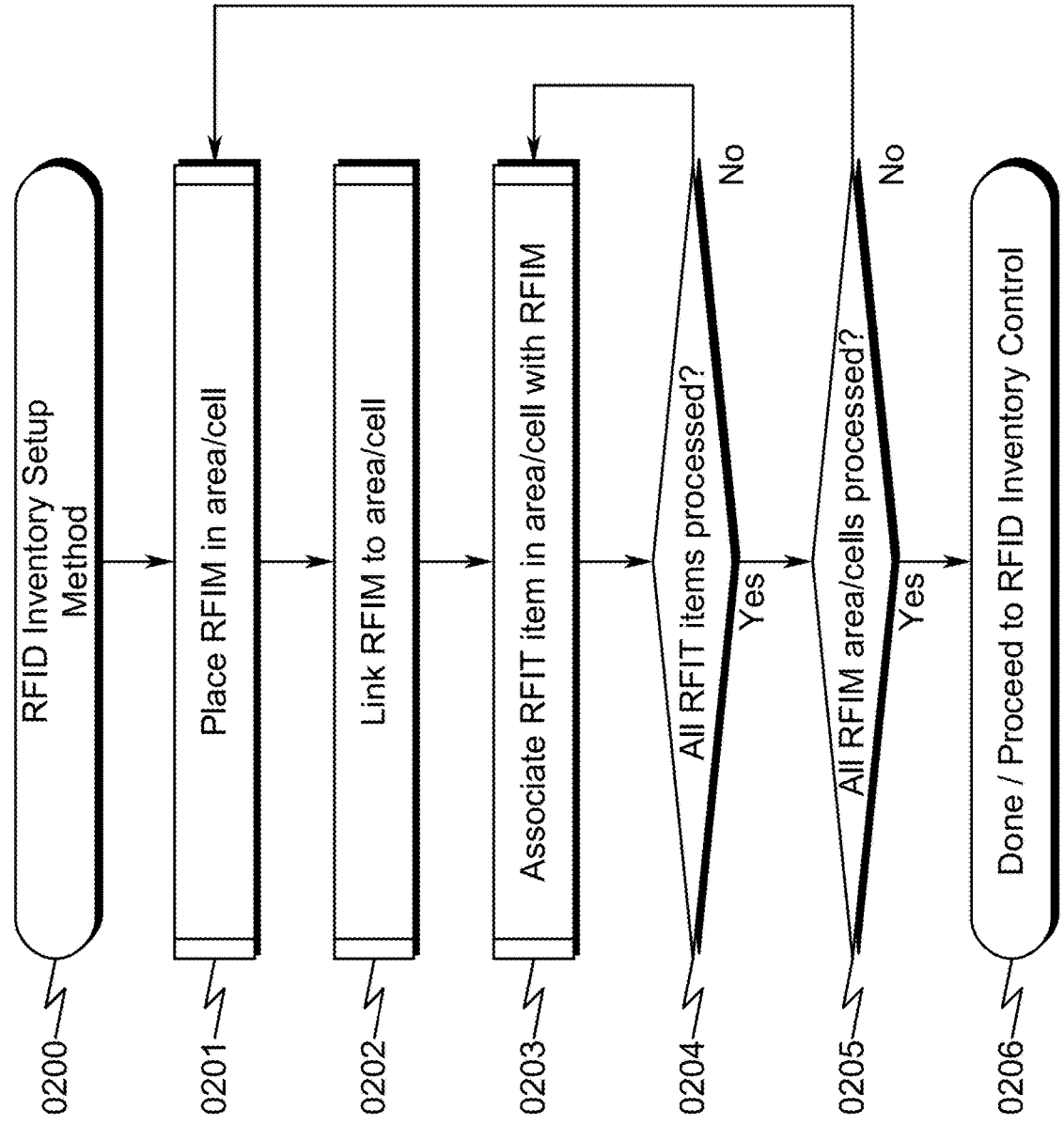
FIG. 2 illustrates a flowchart depicting a preferred exemplary invention setup method embodiment.
Figure 3:
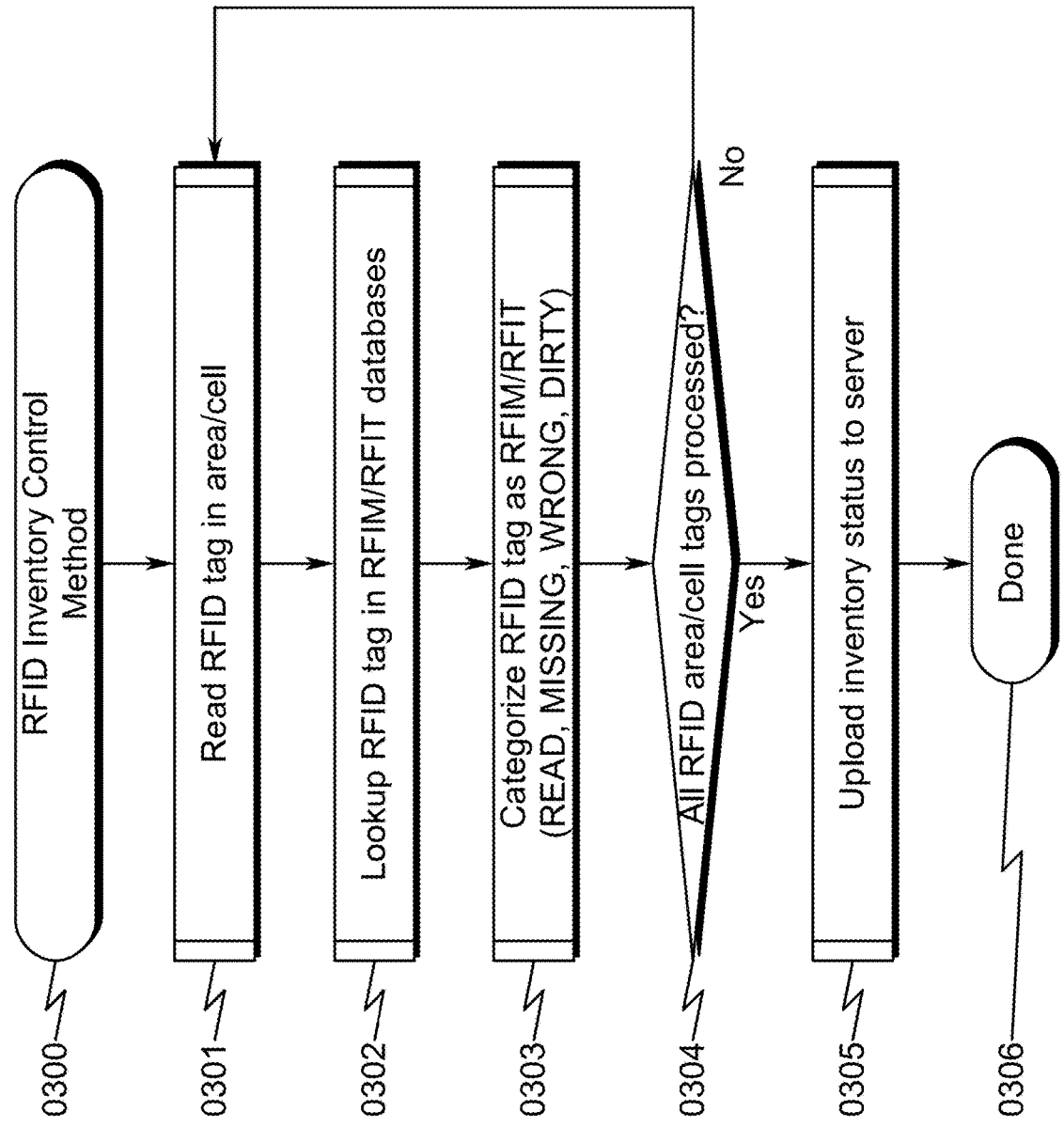
FIG. 3 illustrates a flowchart depicting a preferred exemplary invention inventory method embodiment.

This present invention setup method anticipates a wide variety of variations in the basic theme of implementation, but can be generalized as depicted in FIG. 2 (0200) as a RFID inventory setup method comprising:
(1) Physically placing a RFIM master tag within a preselected area/cell (0201);
(2) Linking the RFIM placed in the area/cell within a RFIM database of known area/cells (0202);
(3) Associating an RFIT item within the area/cell with the RFIM within a RFIT database of known items (0203);
(4) Determining if all RFIT items have been processed and associated with RFIM, and if not, proceeding to step (3) (0204);
(5) Determining if all RFIM master tags have been processed with associated RFIT items, and if not, proceeding to step (1) (0205); and
(6) Terminating the process to allow inventory control to occur with subsequent reading of RFIM and RFIT tags within various areas/cells and crosslinking this information to the completed RFIM database and RFIT database as generally depicted in FIG. 3 (0300) (0206).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention. This and other methods described herein are optimally executed under control of a computer system reading instructions from a computer readable media as described elsewhere herein.

Control Method Overview (0300)

The present invention addresses RFID inventory control generally in a two-step process. The second step in this process is a CONTROL method in which RFID tags are scanned within a given area/cell and then it is determined whether the tag read is a RFIM master tag or a RFIT item tag. Database lookup is performed against the data stored in the previous SETUP operation to categorize the tag read according to whether the tag is a RFIM or RFIT and whether the tag is known or unknown with respect to the RFIM/RFIT databases.

This present invention setup method anticipates a wide variety of variations in the basic theme of implementation, but can be generalized as depicted in FIG. 3 (0300) as a RFID inventory control method comprising:
(1) Reading a RFID tag in an area/cell (0301);
(2) Lookup the RFID tag in RFIM/RFIT databases (0302);
(3) Categorizing the scanned RFID tag (READ (corresponding to RFIT that are properly within the RFAC and found during the scan), MISSING (corresponding to RFIT that should be located within the selected RFAC but were not scanned), WRONG (corresponding to RFIT that were scanned in the RFAC but should be within another RFAC), or DIRTY (RFIT that are not associated with any known RFAC)) (0303);
(4) Determining if all RFID tags have been processed within the area/cell, and if not, proceeding to step (1) (0304);
(5) Uploading the inventory status of the RFID tags to a compute server to finalize the inventory control state (0305); and
(6) Terminating the process (0306).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention. This and other methods described herein are optimally executed under control of a computer system reading instructions from a computer readable media as described elsewhere herein.

Client Side/Server Side Coordination Methodology

The present invention typically incorporates a paired client side and server side coordinating processes. These are detailed in FIG. 2 (0200) and FIG. 3 (0300) respectively. The client side method is responsible for gathering RFID tag item (RFIT) data from area/cells identified by master tags (RFIM) and the server side is responsible for gathering data from various dumps of this area/cell data to form a complete inventory.

Client Side Method Overview (0400)

The client side method forms the process for the CLIENT SIDE or the DEVICE side of the process. This would typically be a device such as (but not limited to) a mobile device with integrated RFID interrogation capability. Some examples might be a Honeywell CN70e, Zebra TC51 with RFD8500 module. These devices typically run either MICROSOFT® WINDOWS® Embedded handheld or ANDROID although this process should be O/S agnostic and is not targeted to a particular device or manufacturer.

Figure 4:
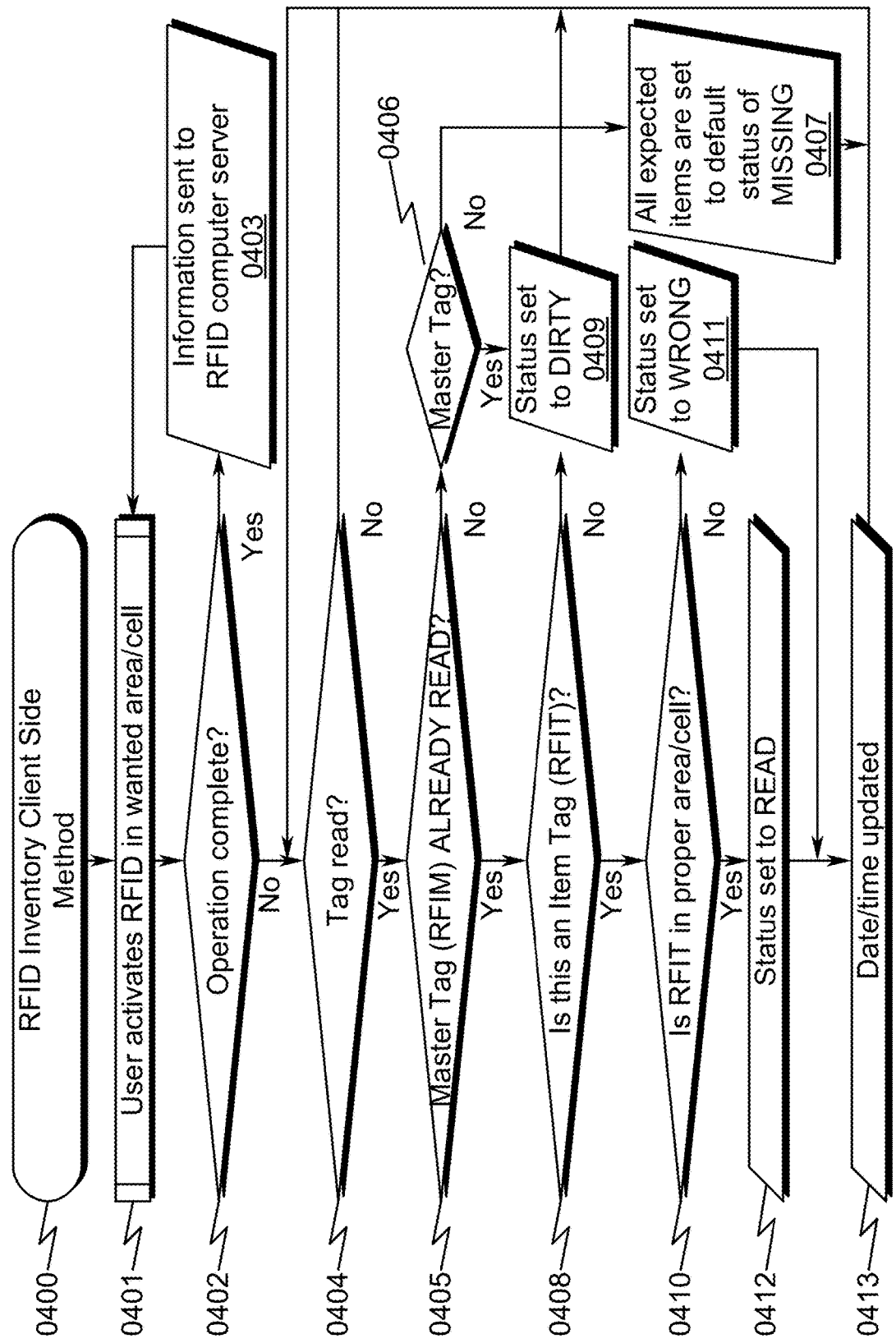
FIG. 4 illustrates a flowchart depicting a preferred exemplary invention client side method embodiment.

The present invention client side method anticipates a wide variety of variations in the basic theme of implementation, but can be generalized as depicted in FIG. 4 (0400) as a RFID inventory client side method comprising:
(1) The user activates RFID interrogation process in the selected cell/area. RFID tags (RFIT) are then read at a high rate of speed and processed as they are read (0401);
(2) Determining if the RFIT interrogation of the selected cell/area is complete, and if not, proceeding to step (4) (0402);
(3) When operator completes the RFIT scanning operation then all items are transmitted to a RFID compute server (RFCS) by gathering information relating to RFIT that have been read and transmitting this data to a compute server, then proceeding to step (1). To minimize traffic, only MISSING, DIRTY, WRONG, and READ tags are transmitted and NOT the entire inventory (0403);
(4) Determining if a RFIM/RFIT has been read, and if not, proceeding to step (4) (0404);
(5) Determining if a master RFIT (RFIM) has already been read by inspecting the MasterAreaCellTagRead flag, and if so, proceeding to step (8) (0405);
(6) Determined if the RFIT read was a RFIM, and if so, proceeding to step (9) (0406);
(7) Setting all expected items within the RFIM data field to a default status of MISSING and proceeding to step (4) (0407);
(8) Determine if this is an item tag (RFIT) (this determination is only done if a MASTER AREA/CELL TAG READ flag is not set) and if so, proceeding to step (10) (0408);
(9) Setting the RFIT status to DIRTY and proceeding to step (4) (0409);
(10) Determine if the RFIT tag is in proper location by comparing the scanning area/cell locale to that of the RFIT and if so, proceeding to step (12) (0410);
(11) Setting the RFIT status to WRONG and proceeding to step (13) (0411);
(12) Setting the RFIT status as READ (0412); and
(13) Updating the date/time associated with the RFIT read and proceeding to step (4) (0413).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention. This and other methods described herein are optimally executed under control of a computer system reading instructions from a computer readable media as described elsewhere herein.

Note that determination of the READ/DIRTY/WRONG status of a given RFIT may be delayed until after a RFIM has been located within the area/cell. This allows all RFID tags within an area to be read without the need for ordering of the RFIM as the first tag read. Once the RFID tags have been read, a lookup of tags associated with the RFIM that was located within the area/cell can be performed, and then the RFIT that were read within the area/cell can be categorized as READ/DIRTY/WRONG depending on their status. One skilled in the art will recognize that either of these options is available within the context of the present invention teachings.

Alternate Client Side Method Overview

An alternative client side method overview comprises the following steps:
(1) If this is a master tag then the area/cell field is set and the MASTER AREA/CELL TAG READ is set. Go to next tag.
(2) If this tag is not an item tag then set status=DIRTY. Go to next tag.
(3) Does this tag belong in this area/cell? If not then set the status=WRONG. An optional FOUND AT field should be set to the current area/cell for quick resolution. Go to next tag.
(4) If tag is in proper location then set status as READ. Go to next tag.
(5) When operator completes operation then all items are transmitted to server. To minimize traffic, all that needs to be sent are MISSING, DIRTY, WRONG tags and read tags and NOT the entire inventory.

Server Side Method Overview (0500)

The server-side process deals with how to interpret the data from the client side inventory scan and which records should be updated and which records should not be updated. An important part of this process that the device needs to know is the ESTIMATED INVENTORY WINDOW. This variable is an estimation of the time it takes to perform an inventory. This variable may be different from company to company but this is an important variable that allows the server to determine what needs to be updated and what should not be updated.

Figure 5:
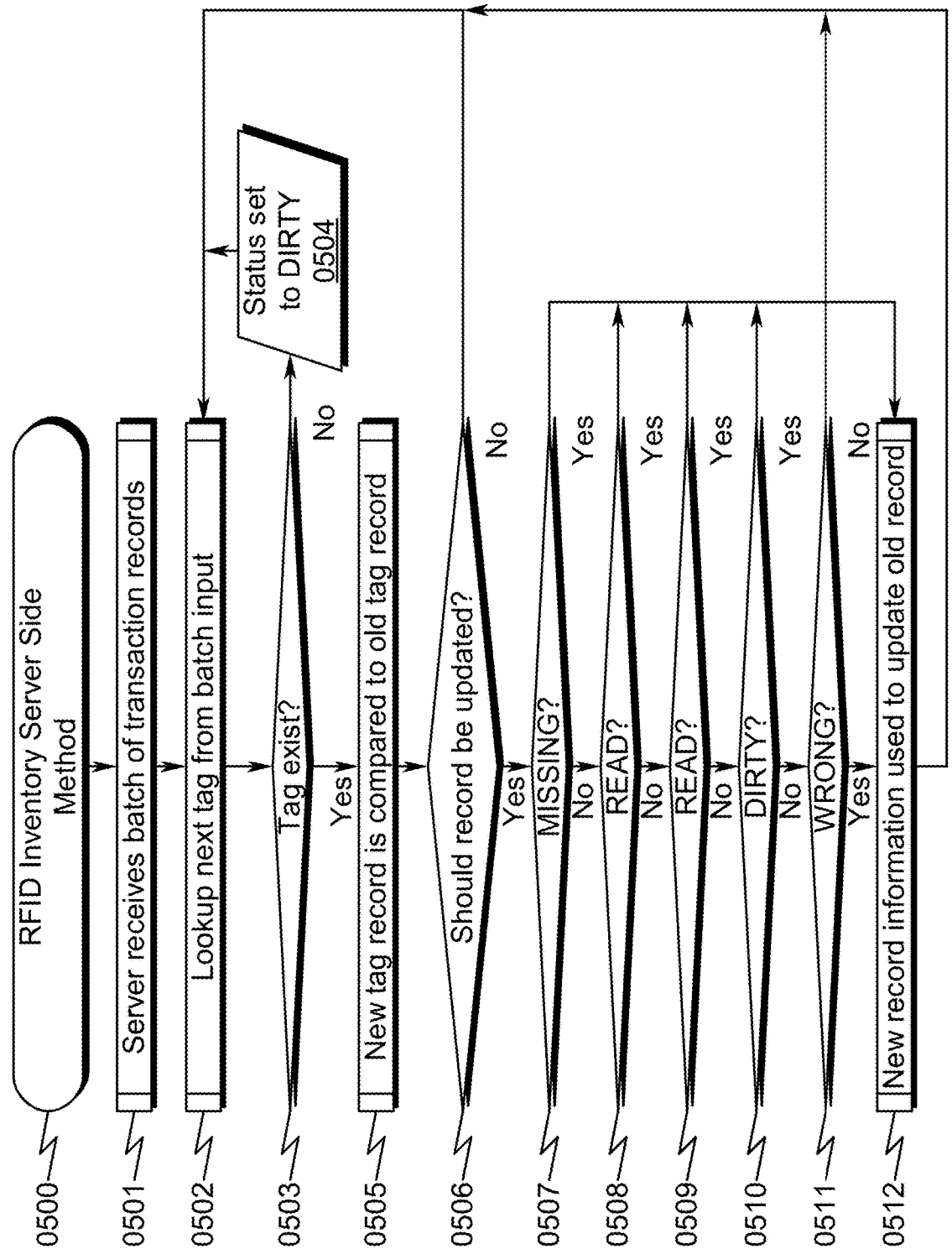
FIG. 5 illustrates a flowchart depicting a preferred exemplary invention server side method embodiment.

The present invention server side method anticipates a wide variety of variations in the basic theme of implementation, but can be generalized as depicted in FIG. 5 (0500) as a RFID inventory server side method comprising:
(1) Server received batch of tag data (0501);
(2) Tag is looked up (0502);
(3) If the tag does exist then proceed to step (5) (0503);
(4) Place a new record in current or different data base as a DIRTY tag that does not exist and proceed to step (2) (0504);
(5) If the tag does exist then the new record data is compared to the old record data (current status in server database) (0505);
(6) Determine if a tag database entry should be updated with the new record from the device, and if not, proceed to step (2) (0506);

(7) If new record status is a MISSING tag then current tag ID record status is read along with date time (0507);
(8) If current record status is READ and its date/time stamp is within the Inventory Estimate Window then the new record with the status of MISSING is ignored BUT date/time stamps may be updated as a keep warm. This system compensates for the fact that when multiple devices are reading the same area/cell, it is possible that one device may read the item tag while the other misses the tag. This simple rule will allow for the one miss/one hit scenario. The assumption is that the item/tool will not physically disappear from the area/cell during the inventory (0508);
(9) If new record status is a READ tag then all fields of this tag are updated (0509);
(10) If new record status is a DIRTY tag then the system may save this record new a different dataset or insert into the current data set with user/system definable default values (0510);
(11) If new record status is a WRONG tag then current record for the tag is updated (0511); and
(12) Updating the date/time associated with the RFIT read and proceeding to step (2) (0512).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention. This and other methods described herein are optimally executed under control of a computer system reading instructions from a computer readable media as described elsewhere herein.

Master Tag (RFIM) Assignment (0600)

RFID master tags (RFIM) must be assigned to an area/cell before items can be assigned to areas/cells. This process is accomplished through the use of an RFID enabled device/scanner (RFSC) which will scan a master tag then allow user to set the area/cell information for that master tag. Key items for this process may include:
(1) Master Tag must be unique.
(2) Master Tag must NOT already be assigned in the system. Master tags already assigned must first be REMOVED from the system.
(3) Area/cell must ALSO be unique across the application scope.

Figure 6:
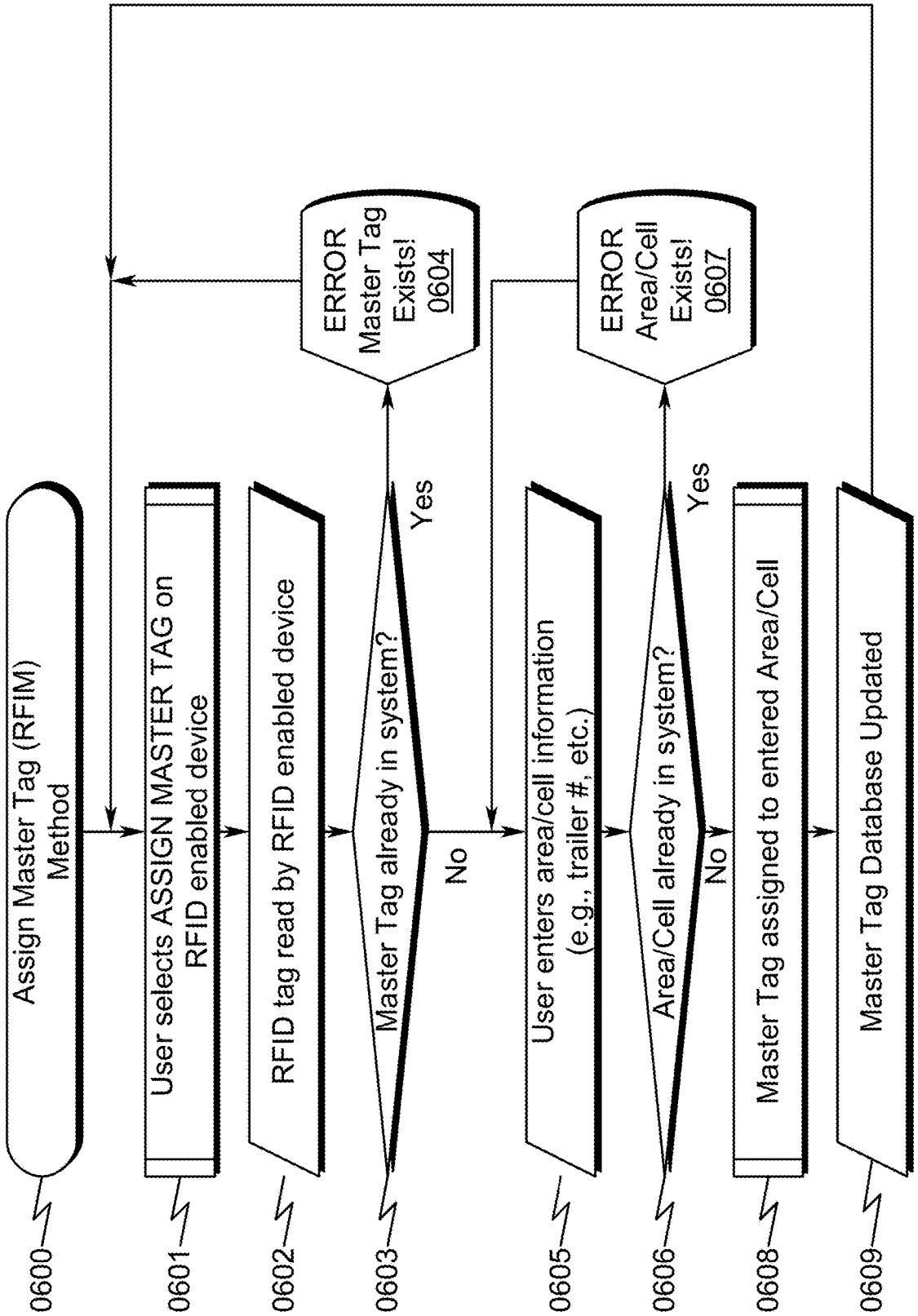
FIG. 6 illustrates a flowchart depicting a preferred exemplary invention master tag (RFIM) assignment method embodiment.

The present invention master tag (RFIM) assignment method anticipates a wide variety of variations in the basic theme of implementation, but can be generalized as depicted in FIG. 6 (0600) as a RFID inventory master tag (RFIM) assignment method comprising:
(1) User selecting ASSIGN MASTER TAG on RFID enabled device (RFSC) (0601);
(2) Reading a RFID tag by RFID enabled device (RFSC) (0602);
(3) Determining if the read master tag (RFIM) is already in the system RFID Tag Database (RFTD), and if not, proceeding to step (5) (0603);
(4) Issuing an error message to the user indicating the master tag exists and proceed to step (2) (0604);
(5) Accepting area/cell information input from the user (0605);
(6) Determine if the entered area/cell is already in the system RFID Tag Database (RFTD), and if not proceeding to step (8) (0606);
(7) Issuing an error message to the user indicating the area/cell exists and proceed to step (5) (0607);
(8) Assigning the master tag (RFIM) to the area/cell (0608);
(9) Updating a system RFID Tag Database (RFTD) with the associated master tag and area/cell user input and proceeding to step (1) (0609).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention. This and other methods described herein are optimally executed under control of a computer system reading instructions from a computer readable media as described elsewhere herein.

Assigning Item Tags (RFIT) to Area/Cell (0700)

Inventory items must also be assigned to an area/cell before inventory functions can be performed. This process is done with an RFID enabled device where the user will simply scan a master tag (RFIM) then scan item tags (RFIT) thus updating the system RFID Tag Database (RFTD) with the item tag (RFIT). Key items for this process may include:
(1) Master tag must already be assigned.
(2) Item tag can already be in the system and if they are then their assignment is updated. This facilitates relocating items from one area/cell to another.

Figure 7:
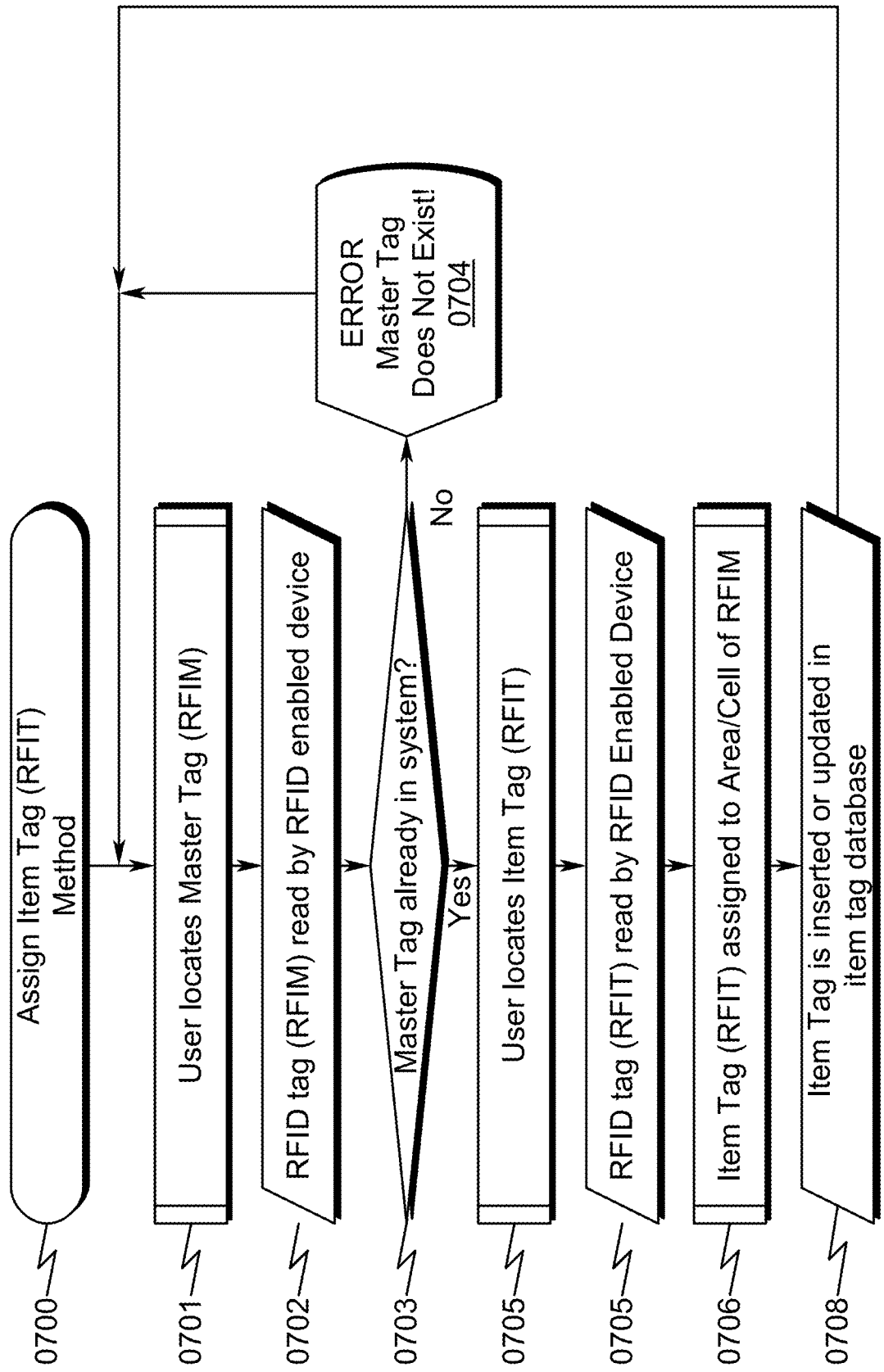
FIG. 7 illustrates a flowchart depicting a preferred exemplary invention item tag (RFIT) area/cell assignment method embodiment.

The present invention item tag (RFIT) assignment method anticipates a wide variety of variations in the basic theme of implementation, but can be generalized as depicted in FIG. 7 (0700) as a RFID inventory item tag (RFIT) assignment method comprising:
(1) User locates master tag (RFIM) (0701);
(2) Master tag (RFIM) is scanned with an RFID enabled device (RFSC) (0702);
(3) Determining if the read master tag (RFIM) is already in the system RFID Tag Database (RFTD), and if not, proceeding to step (5) (0703);
(4) Issuing an error message to the user indicating the master tag exists and proceed to step (1) (0704);
(5) User locates item tag (RFIT) (0705);
(6) Item tag (RFIT) is scanned with an RFID enabled device (RFSC) (0706);
(7) Item tag (RFIT) is assigned to area/cell associated with RFIM (0707); and
(8) Item tag (RFIT) is inserted or updated in a system RFID Tag Database (RFTD) and control proceeds to step (1) (0708).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention. This and other methods described herein are optimally executed under control of a computer system reading instructions from a computer readable media as described elsewhere herein.

Master Tag (RFIM) Removal (0800)

There may be situations where a master tag must be removed from the system RFID Tag Database (RFTD). For example, a trailer was wrecked and scrapped. In this situation, the normal process should be that all item tags in this trailer are relocated with the ASSIGN ITEM TAG process to another area/cell. The user then will scan the master tag which will trigger the master tag to be removed from the database. All item tags that are still assigned to this master tag are set as UNASSIGNED in the system so that they can easily be found and relocated in the database.

Figure 8:
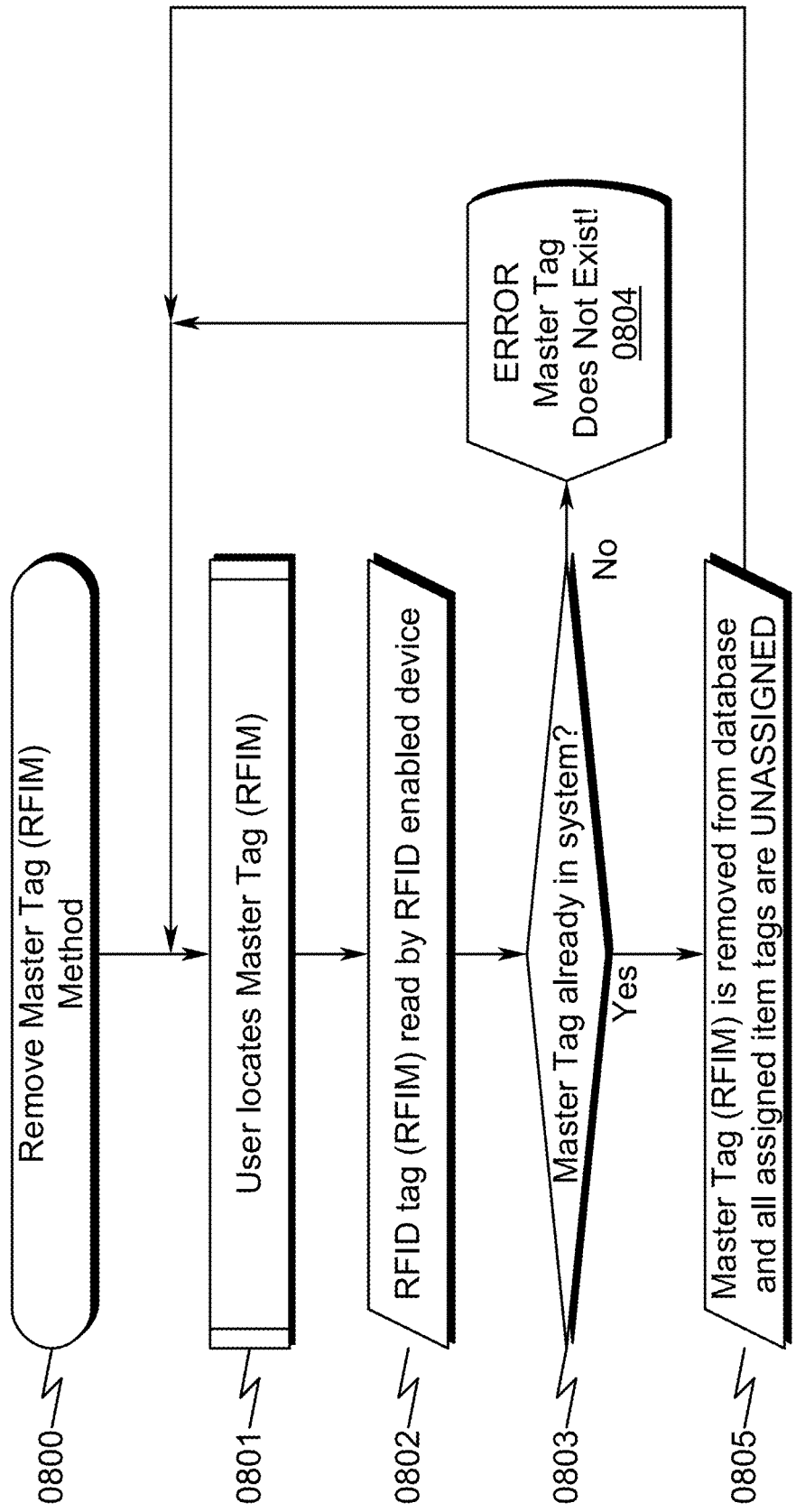
FIG. 8 illustrates a flowchart depicting a preferred exemplary invention master tag (RFIM) removal method embodiment.

The present invention master tag (RFIM) removal method anticipates a wide variety of variations in the basic theme of implementation, but can be generalized as depicted in FIG. 8 (0800) as a RFID inventory master tag (RFIM) removal method comprising:

(1) User locates master tag (RFIM) (0801);
(2) Master tag (RFIM) is scanned with an RFID enabled device (RFSC) (0802);
(3) Determining if the read master tag (RFIM) is already in the system RFID Tag Database (RFTD), and if not, proceeding to step (5) (0803);
(4) Issuing an error message to the user indicating the master tag exists and proceed to step (1) (0804); and
(5) Master tag (RFIM) is removed from system RFID Tag Database (RFTD) and all assigned item tags are marked as UNASSIGNED with control proceeding to step (1) (0805).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention. This and other methods described herein are optimally executed under control of a computer system reading instructions from a computer readable media as described elsewhere herein.

RFID Server Processing (0900)-(1000)

Tag data collected by the RFSC may be processing in a variety of ways by the inventory compute server (ICS). Several invention embodiments permit multiple RFSC to batch download data to the ICS such that multiple RFSC may be simultaneously performing inventory operations within a given area/cell. In these circumstances it is possible for the data from the multiple RFSC to be inconsistent with the SID. Processing logic within the ICS may be aware of this possibility and process the batch data accordingly as depicted in the flowcharts of FIG. 9 (0900)-FIG. 10 (1000).

Figure 9:
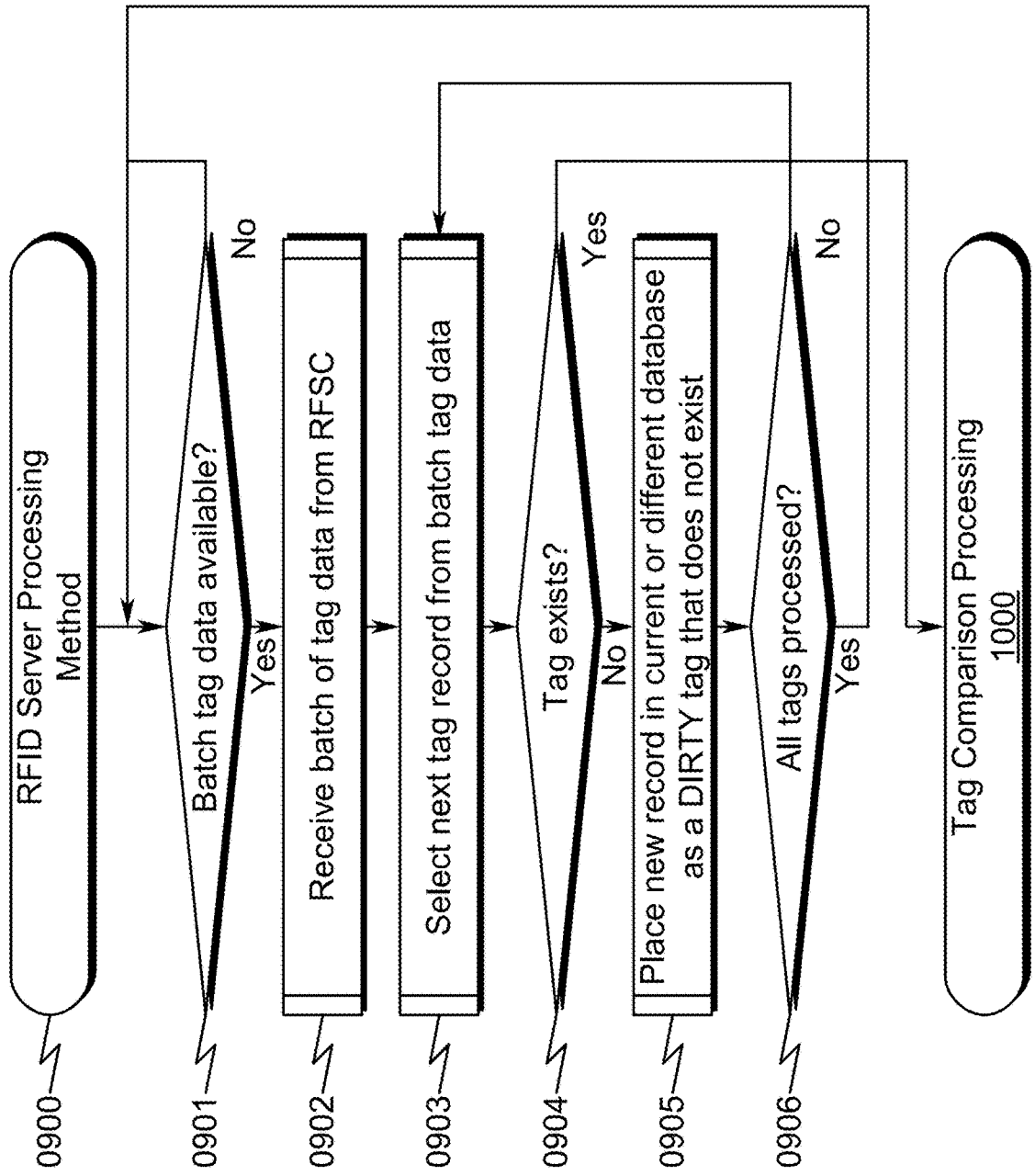
FIG. 9 illustrates a flowchart depicting a preferred exemplary invention server processing method embodiment (page 1/2)
Figure 10:
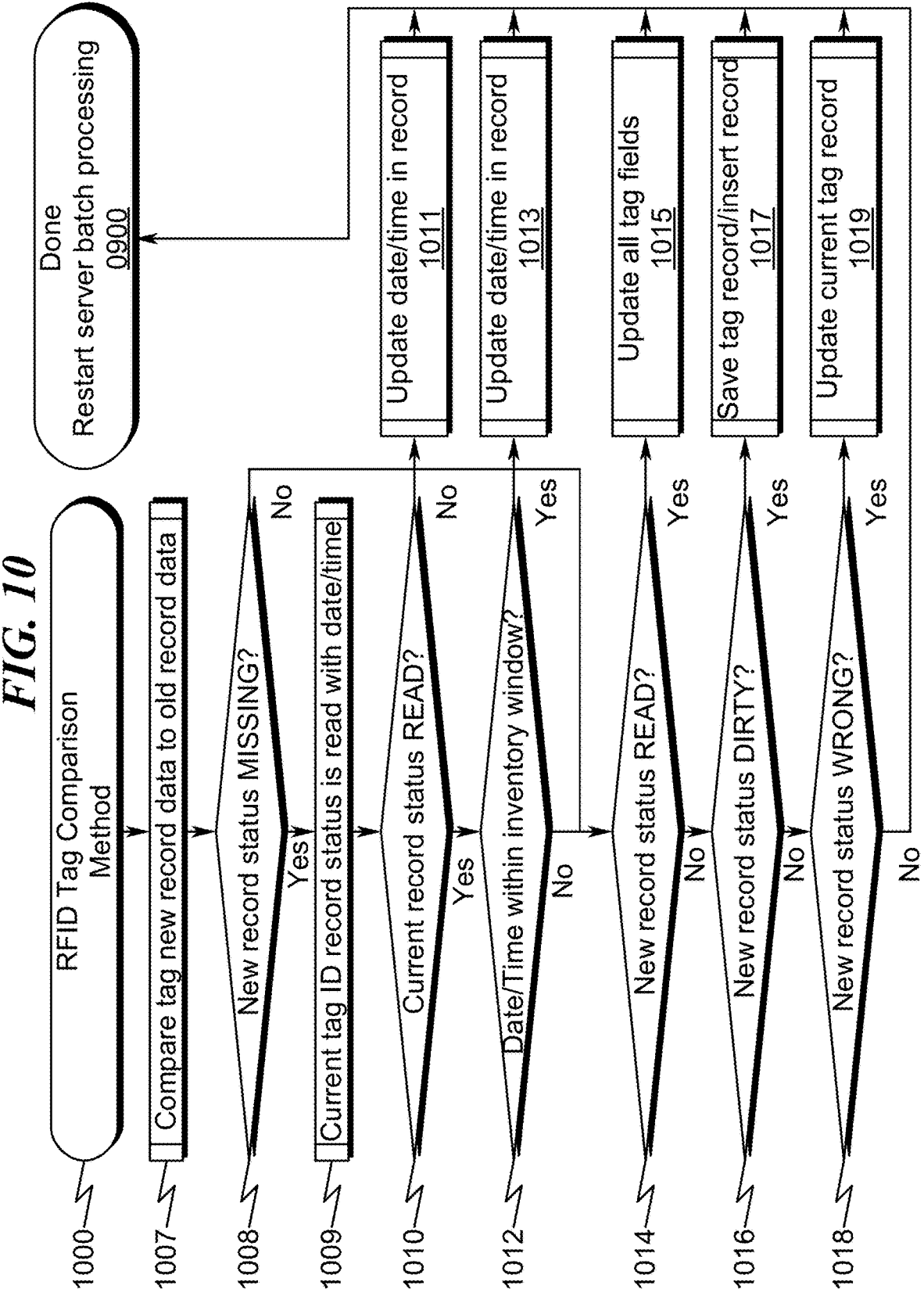
FIG. 10 illustrates a flowchart depicting a preferred exemplary invention tag comparison method embodiment (page 2/2)

The present invention server processing method anticipates a wide variety of variations in the basic theme of implementation, but can be generalized as depicted in FIG. 9 (0900)-FIG. 10 (1000) as a RFID server processing and tag comparison method comprising:

(1) With the ICS, determining if batch tag data is available from a RFSC, and if not, proceeding to step (1) (0901);
(2) With the ICS, receiving a batch of tag data from a RFSC (0902);
(3) Selecting the next (first) tag record from the batch data received (0903);
(4) Determining if the tag exists in the SID, and if so, proceed to step (7) (0904);
(5) Place a new record in the current or different SID database as a DIRTY tag that does not exist (0905);
(6) Determining if all tags have been processed, and if so, proceeding to step (1), otherwise proceeding to step (3) (0906);
(7) Comparing batch tag new record data to old tag record data (1007);
(8) Determining if the new record status is MISSING, and if not, proceeding to step (14) (1008);
(9) Reading the current tag ID record status with date/time (1009);
(10) Determining if the current record status is READ, and if so, proceeding to step (12), (1010);
(11) Updating the date/time in the tag record and proceeding to step (1) (1011);
(12) Determining if the date/time is within the inventory window, and if not, proceeding to step (14) (1012);
(13) Updating the date/time in the tag record and proceeding to step (1) (1013);
(14) Determining if the new record status is READ, and if not, proceeding to step (16) (1014);
(15) Updating all rag fields and proceeding to step (1) (1015);
(16) Determining if the new record status is DIRTY, and if not, proceeding to step (18) (1016);
(17) Saving the tag record or inserting a new record in the SID and proceeding to step (1) (1017);
(18) Determining if the new record status is WRONG, and if not, proceeding to step (1) (1018); and
(19) Updating the current tag record and proceeding to step (1) (1019).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention. This and other methods described herein are optimally executed under control of a computer system reading instructions from a computer readable media as described elsewhere herein.

Exemplary Database Structures (1100)-(1400)

Figure 11:
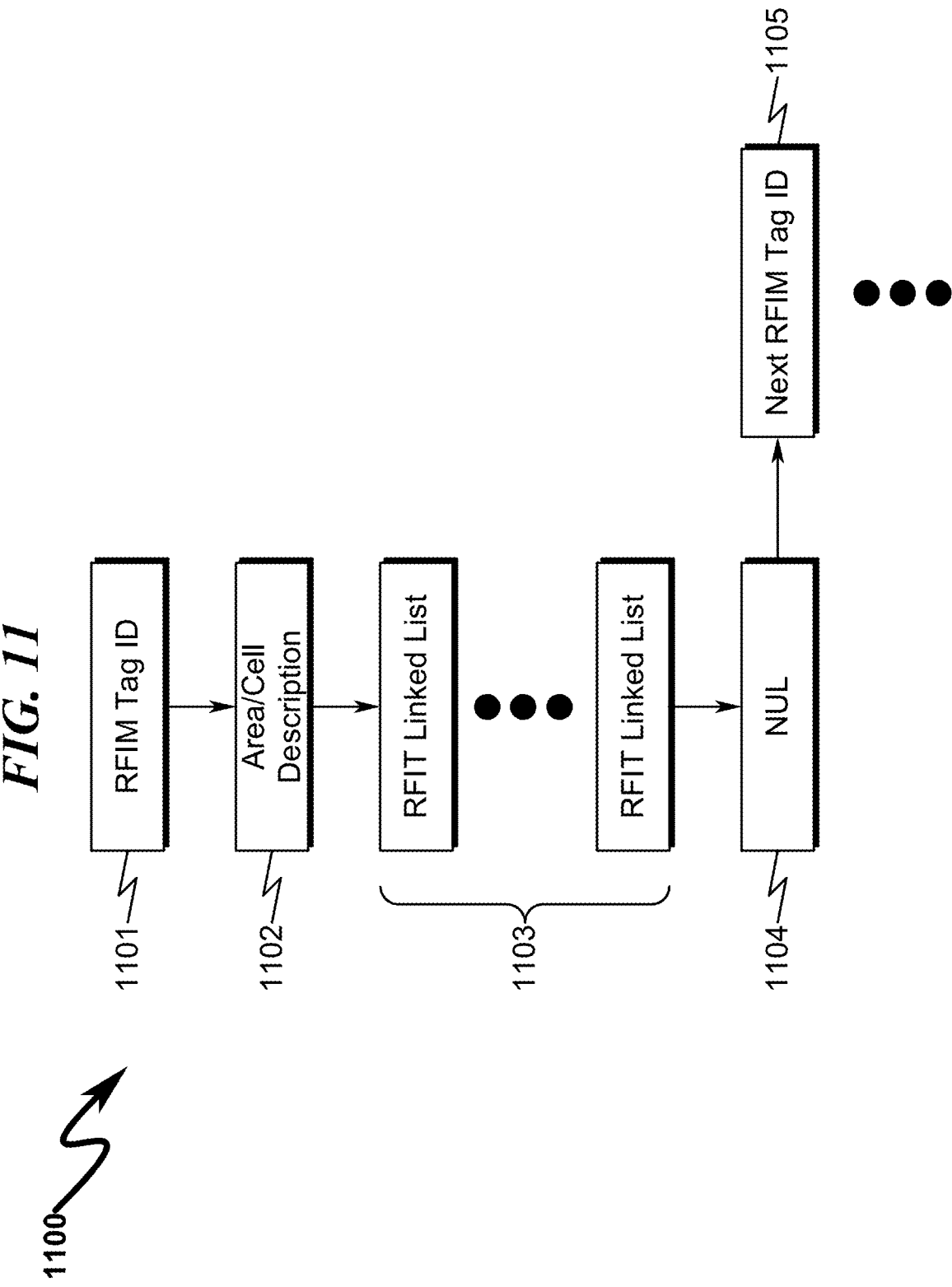
FIG. 11 illustrates a data schema depicting an exemplary RFIM data structure associating a RFIM master tag with one or more RFIT item tags.
Figure 14:
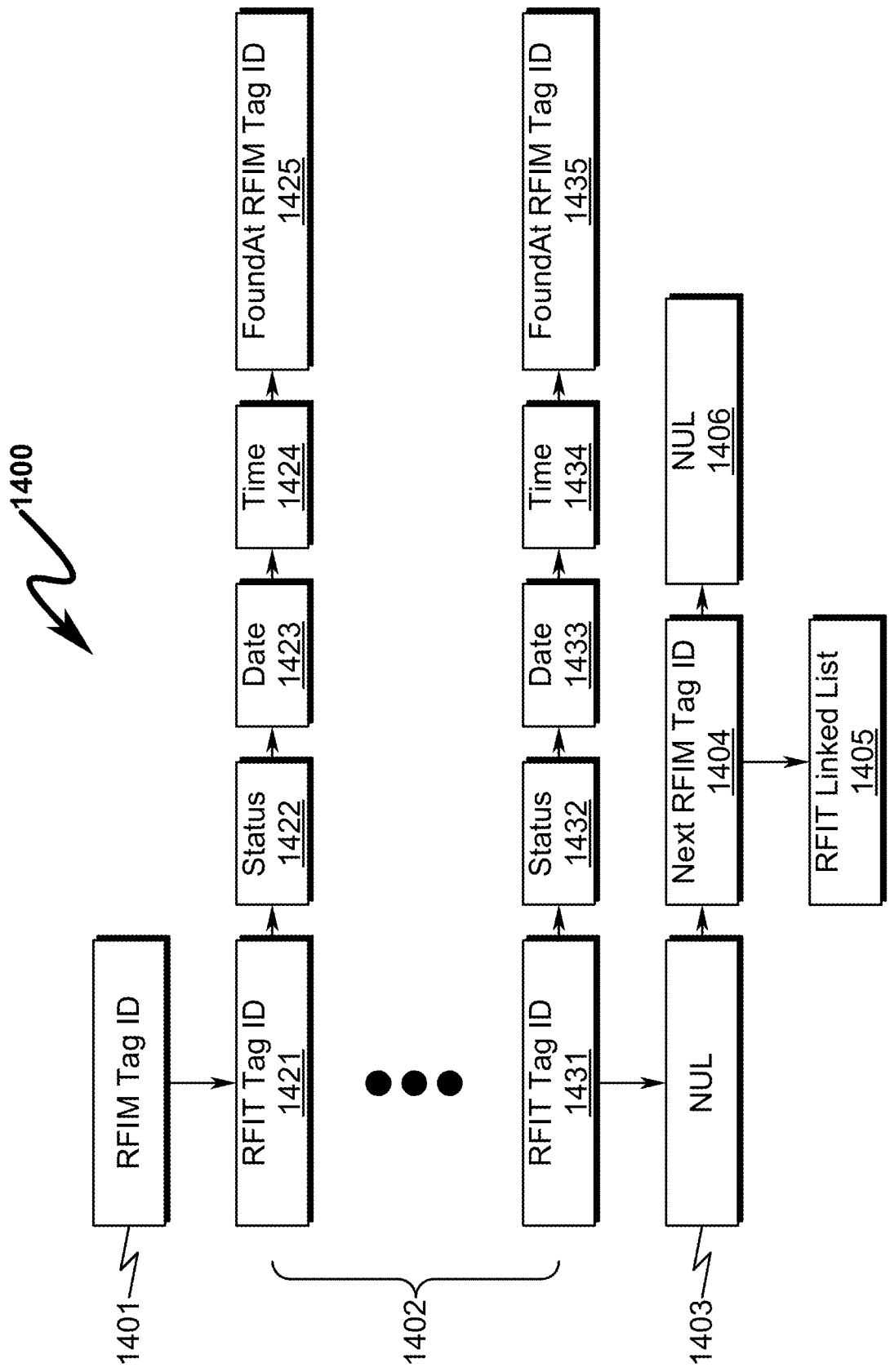
FIG. 14 illustrates an exemplary reporting structure for RFIM tags and their associated RFIT tags including FoundAt RFIM data fields that identify the location of RFIT tags found at the WRONG location.

While a wide variety of RFIM/RFIT database structures may be utilized with the present invention, several examples of preferred data structures are generally depicted in FIG. 11 (1100)-FIG. 14 (1400).

FIG. 11 (1100) depicts a general RFIM database structure that includes a list of RFIM tags (1101) that include an area/cell description (1102) and an associated linked list (1103) of RFIT item tags associated with the RFIM (1101). This RFIT linked list is terminated by a NUL pointer (1104) and followed by additional RFIM master tag IDs (1105) and its associated RFIT linked list.

Figure 12:
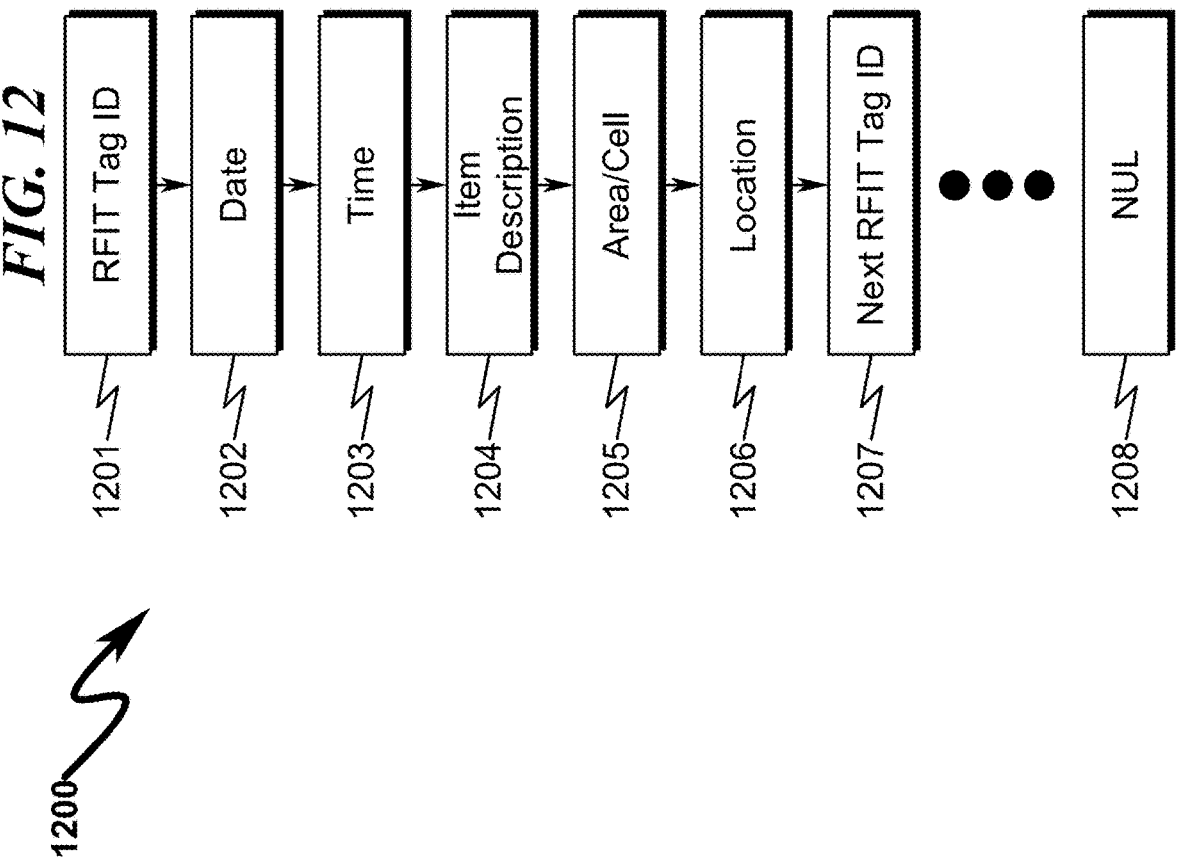
FIG. 12 illustrates a data schema depicting an exemplary RFIT data structure associating a RFIT item tags with identifying data.

FIG. 12 (1200) depicts a general RFIT database structure that includes a list of RFIT tags (1201) that each include a date (1202), time (1203), item description (1204), area/cell identifier (1205), and location within the area/cell (1206). Additional RFIT tag ID structures (1207) and their associated data may also be included with the linked list terminated by a NUL pointer (1208).

Figure 13:
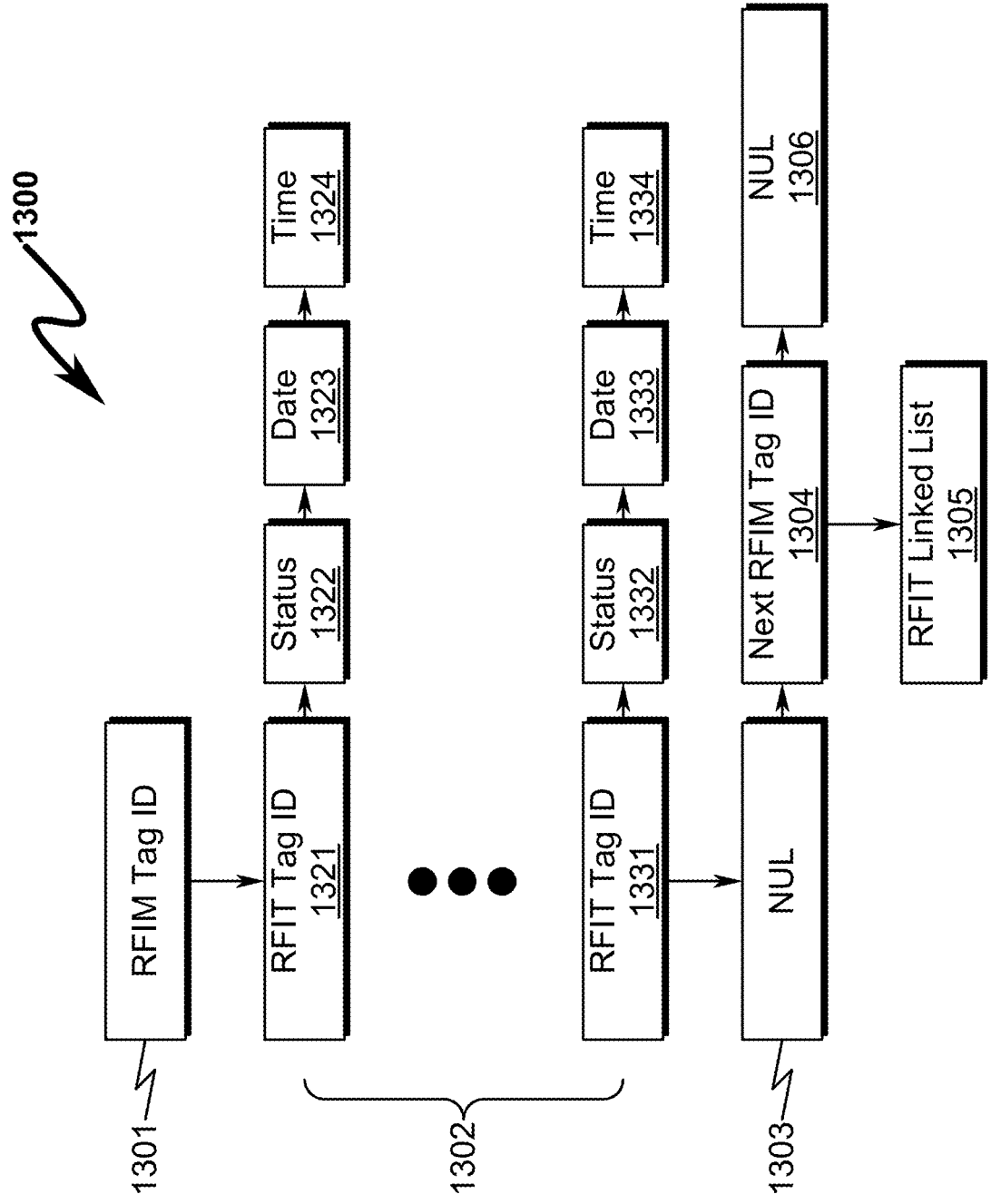
FIG. 13 illustrates an exemplary reporting structure for RFIM tags and their associated RFIT tags.

FIG. 13 (1300) depicts a general reporting data structure used to report inventory to inventory server and server inventory database (SID). Here it can be seen that each RFIM (1301) is linked to a linked list (1302) of RFIT tag IDs (1321, 1331) that each are associated with status (1322, 1323), date (1323, 1333), and time (1324, 1334) data fields. The RFIT linked list (1302) is terminated with a NUL pointer (1303) and followed by the next RFIM tag ID (1304) and its associated RFIT linked list (1305). The list of RFIM tags is then terminated with a NUL pointer (1306). FIG. 14 (1400) depicts a similar reporting data structure that includes a FoundAt RFIM identifier (1425, 1435) that indicates where a RFIT tag found at the wrong location was in fact located. This permits the reporting structure to quickly generate reports of misplaced tags (and their associated inventory) when generating an inventory report.

Exemplary Transaction (1500)-(1600)

The example transaction as generally depicted in FIG. 15 (1500)-FIG. 16 (1600) shows two batches of data coming in from two different devices which are performing inventory in the same area/cell at the same time. This example helps illustrate the complications involved in a multi-device environment whereas one device reads a tag and another misses the tag even though technically the tag is still physically present in the trailer. It also shows a standard READ, a WRONG, tag, and a DIRTY tag.

Read Duration Timer (RDT) Method (1700)-(2200)

Figure 17:
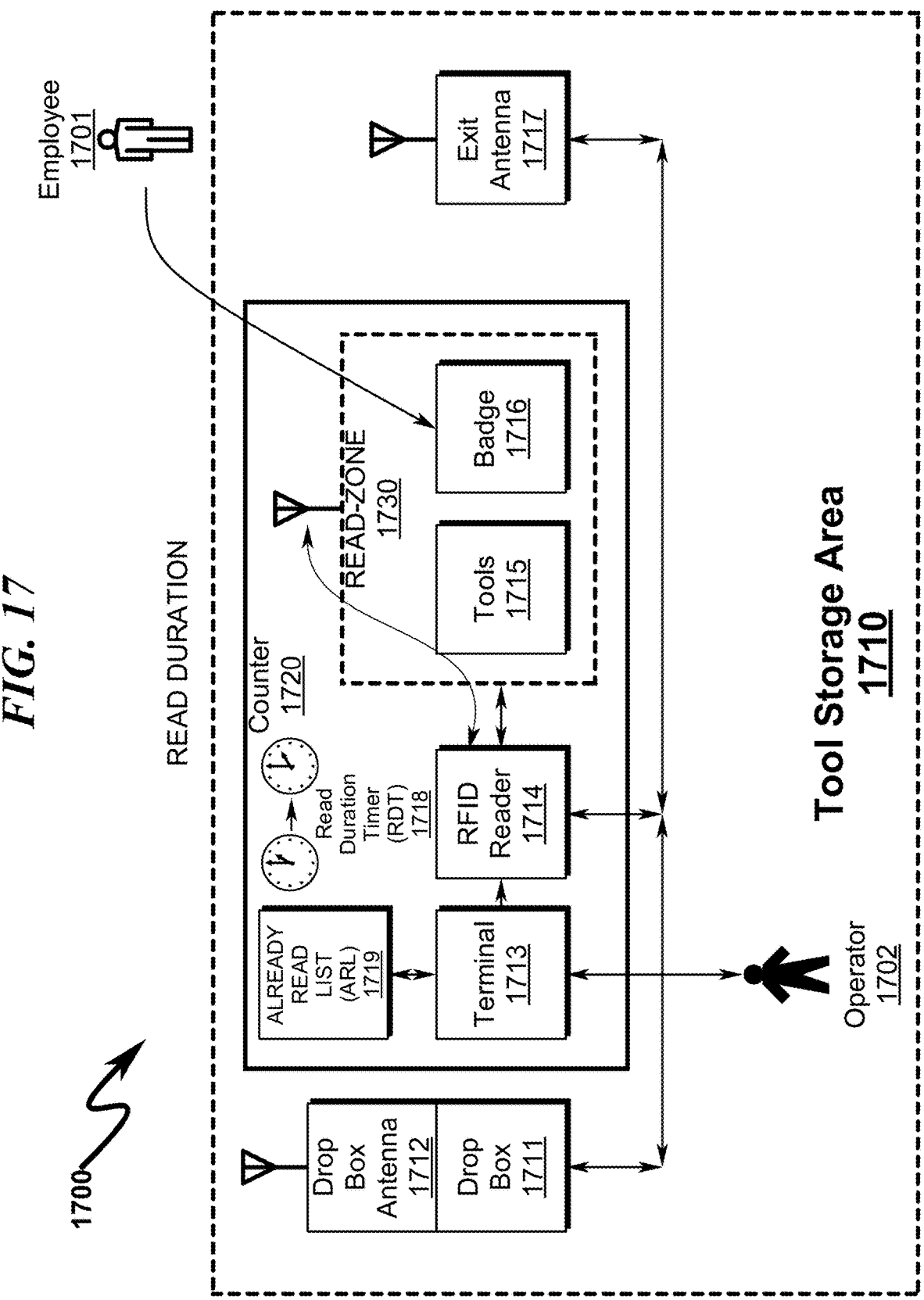
FIG. 17 illustrates a diagram depicting a typical read duration timer (RDT) operation as implemented in some preferred invention embodiments.

The present invention anticipates as generally illustrated in FIG. 17 (1700) that some preferred embodiments may incorporate a READ DURATION TIMER (RDT) method associated with validating the time period in which a tag read will be valid. Within this context the READ DURATION is a length of time (typically associated with an operator selected timer countdown value (TCV)) that a tag read would be valid when read by the RFID reader (1714). During this period if the same tag were presented from the RFID reader to the tag read processor (1713) then it could be ignored thus saving processing time. The tag read processor (1713) would track this read duration time (1718) and when it expired the ALREADY READ list (1719) would then be reset automatically allowing successive reads.

The READ DURATION operation allows the operator to specify a length of time (timer countdown value (TCV)) that the tag read would be valid. This would be specified for fixed mount readers (such as the check-in (1730) area depicted and not utilized in the inventory process. It automatically compensates for the need to allow successive reads at a later time. For example, when an employee checks out a tool he/she may use the tool for 5 minutes then return the tool so the system READ DURATION could be set to 3 minutes thus allowing the return read.

It should be noted that the READ DURATION TIMER is completely different than the RFID EPC Gen2 Search Modes and Sessions 2 read operations which would allow the tag read once BUT need some type of tag reader reset to allow successive reads of the tag. This READ DURATION TIMER (1718) can be assessed across the entire reader (multiple antennas) or on a per antenna basis thus allowing immediate successive reads at a different antenna (1712, 1717).

The RFID Gen2 Session 2 read is based on how many successive reads a reader will read the same tag. Typically a tag reader will only read the RFID tag once for some type of X time value which is different (and not specified in the standard) across multiple manufacturers. This causes a Gen2 Session 2 read to be unreliable when trying to use for X time value which is typically not alterable by the user or operator of the RFID reader device. As indicated by an industry description of the Gen2 Session 2 read:

When the Impinj reader inventories a tag, the session tag state is changed from 'A' to 'B'—how long the tag stays in the 'B' state before reverting back to the 'A' state is called "persistence." It is important to realize that exact persistence times cannot be set by the user; they can only be approximated according to the Search Mode and Session.

These persistence periods range from approximately 2 ms to 2 s in the Gen2 standard.

The present invention READ DURATION TIMER addresses the issue of stale RFID data using a RDT that provides a window of localized RFID activity that does not impact overall network traffic to the main tool/item inventory database. This localized RFID processing is easily adaptable by the operator or RFID reader user, giving additional control that is not present with prior art RFID readers.

A typical example of where this present invention RDT approach helps will now be provided. For example, if a tool set resided in the tool check-in box for 20 minutes, a Session 2 read would cause the RFID reader to read this hundreds of times since the RFID reader may default to reading a tag 10-20 times per second. Each of these tag reads would result in individual network traffic back to the tool database and this would greatly increase the overall network traffic and slow the operation of the operator terminal. The present invention method will lower the network cycles requirement since each tag read does not require a round trip to the tool database to look up the tool info so the RFID scanner could set the read duration to "20 minutes" and process the tool residing in the check-in box one time during the 20 minute window without any loss of generality in updating the tool database.

Figure 18:
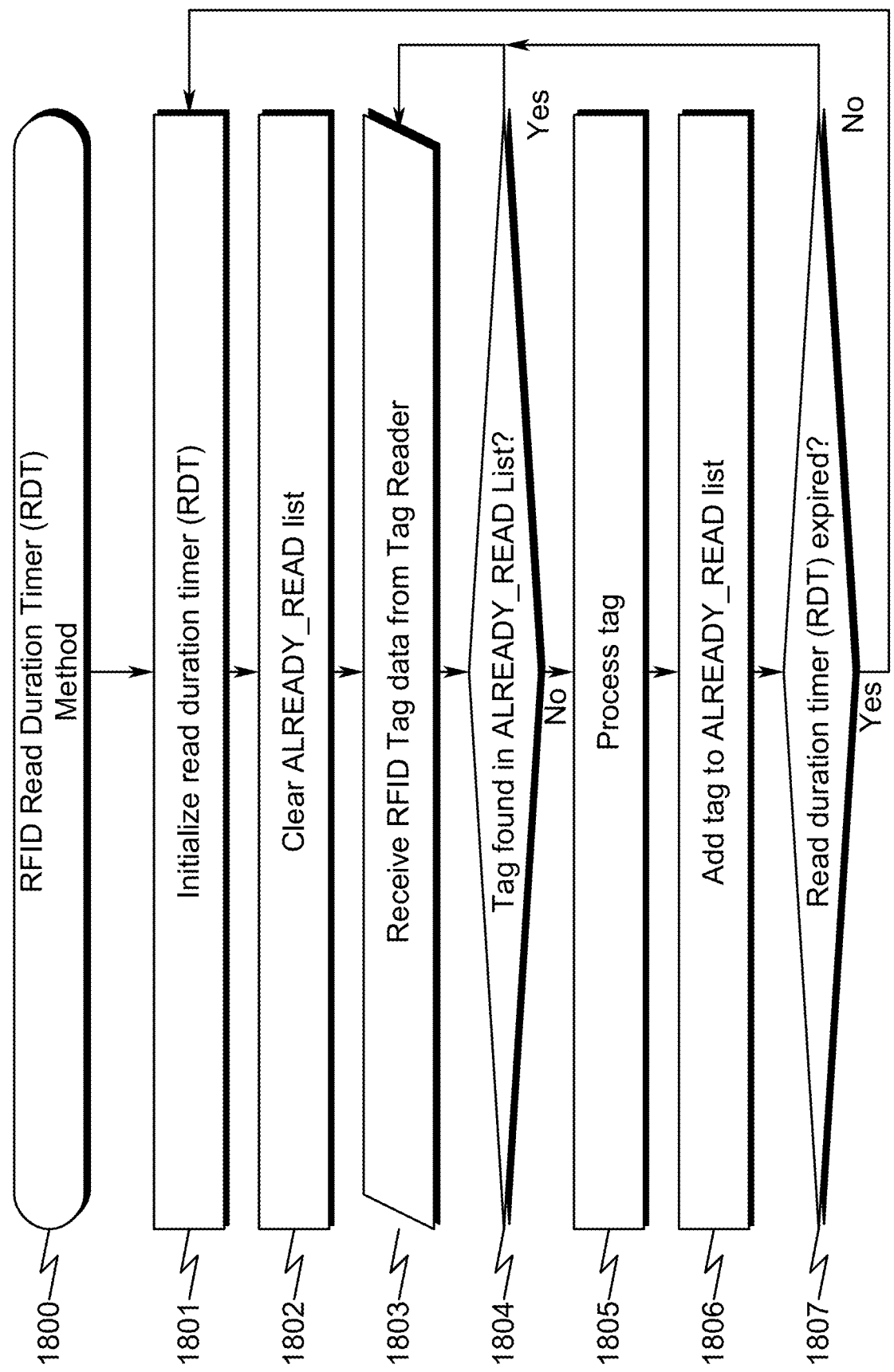
FIG. 18 illustrates a flowchart depicting a typical read duration timer (RDT) method as implemented in some preferred invention embodiments.

As generally depicted in the flowchart of FIG. 18 (1800), this present invention method may be broadly generalized as a read duration timer (RDT) method comprising the following steps:

(1) Initializing a read duration timer (RDT) to a timer countdown value (TCV) associated with permissible tag reads (1801)
(2) clearing an ALREADY_READ list of tags (1802);
(3) receiving RFID tag data from the tag reader (1803);
(4) determining if the tag ID is found in the ALREADY_READ list of tags, and if so, proceeding to step (1) (1804);
(5) processing the tag data contents (1805);
(6) adding the tag ID read to the ALREADY_READ list of tags (1806); and
(7) determining if the READ DURATION timer has expired for the tag ID being processed, and if so, proceeding to step (1), otherwise proceeding to step (3) (1807).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Figure 19:
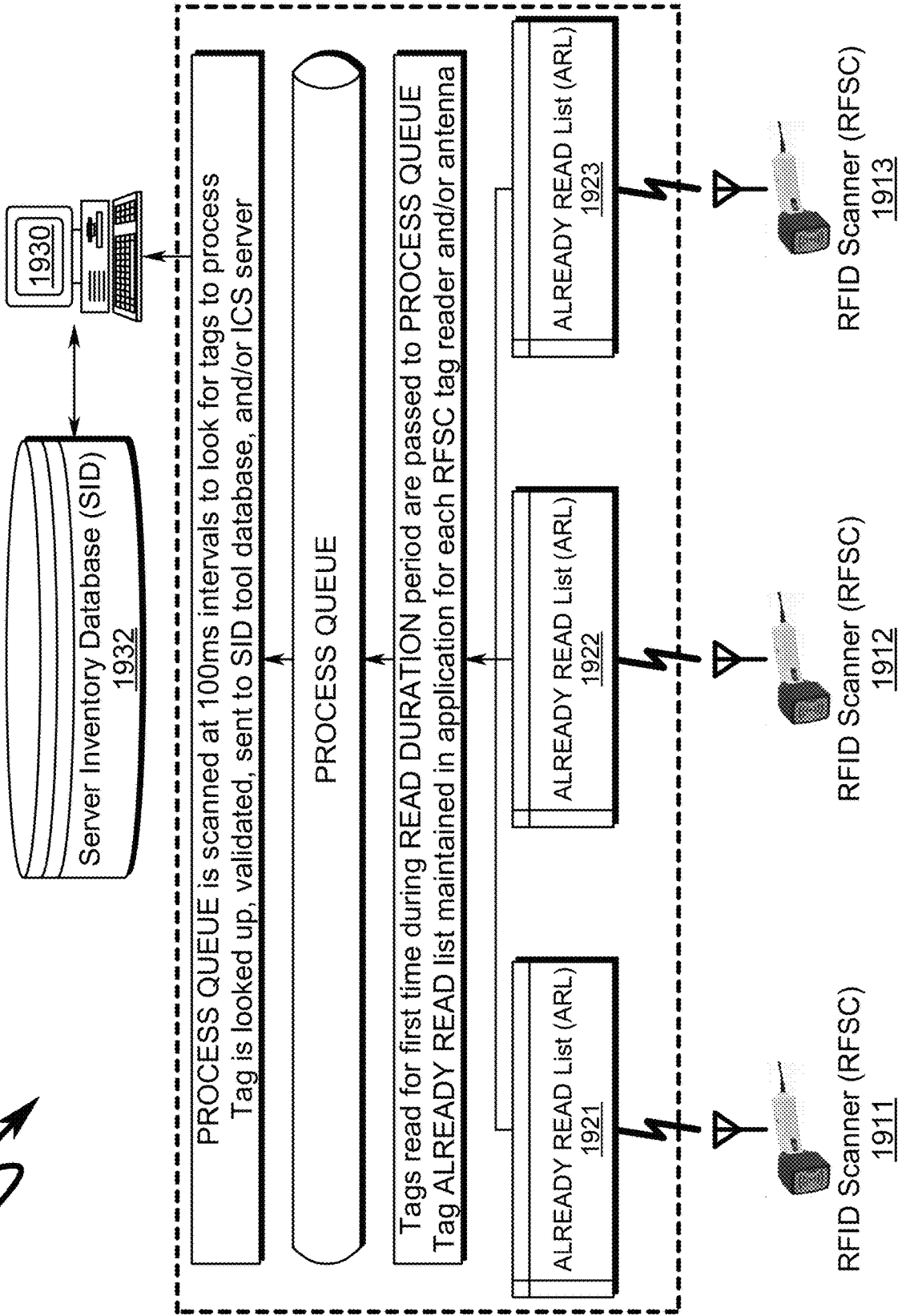
FIG. 19 illustrates a data flow diagram depicting typical RDT operation with multiple ARLs, multiple RFSC readers, and multiple antennas.

A data flow example of the RDT in action is depicted in FIG. 19 (1900) wherein multiple RFSC readers (1911, 1912, 1913) communicate with a compute application over separate antennas to generate multiple already read lists (ARL) (1921, 1922, 1923). Within this application context, the RFID reader and operator terminal/compute application may be integrated into a single unit in some configurations. Tags read for first time during READ DURATION period are passed to PROCESS QUEUE and the tag already read lists (ARL) (1921, 1922, 1923) are maintained in the compute application for each RFSC tag reader and/or antenna. The PROCESS QUEUE is scanned at 100 ms intervals to look for tags to process and tags that are processed are looked up, validated, sent to SID tool database (1931), and/or the ICS server (1930).

Figure 20:
FIG. 20 illustrates an exemplary terminal dialog depicting configuration settings for typical RDT operation.

FIG. 20 (2000) illustrates a typical application dialog that allows setting of the RDT READ DURATION (2001) (also herein termed the timer countdown value (TCV)) along with a PER ANTENNA flag (2002) that allows the READ DURATION to apply for each antenna individually or collectively. This dialog may also be used to configure other RFSC reader parameters as indicated.

Figure 21:
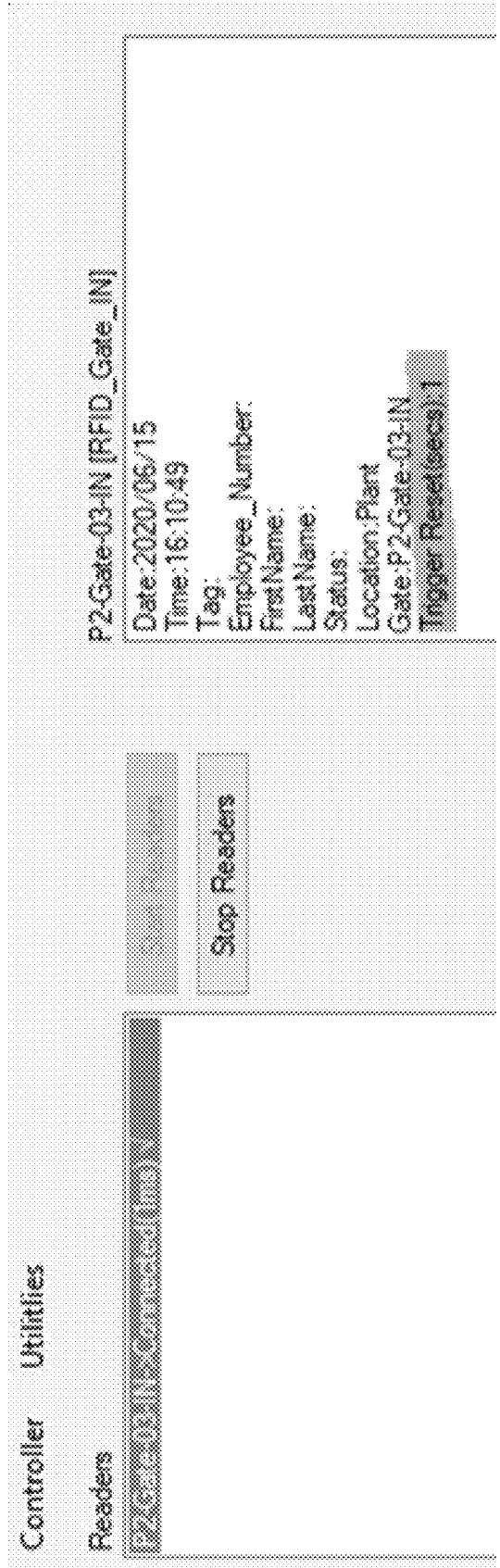
FIG. 21 illustrates an exemplary tag read log associated with an ARL (page 1/2)

FIG. 21 (2100)-FIG. 22 (2200) depict a typical tag ARL and illustrate how a single tag may be read multiple times by the RFSC but only processed once by the process queue. Thus, multiple reads of the tag will not produce individual inquiries to the tool/item database, but rather only on the first read occurrence of the tag WITHIN THE SCOPE OF THE READ DURATION TIMER (RDT).

Attended Check-Out (2300)-(2400)

Figure 23:
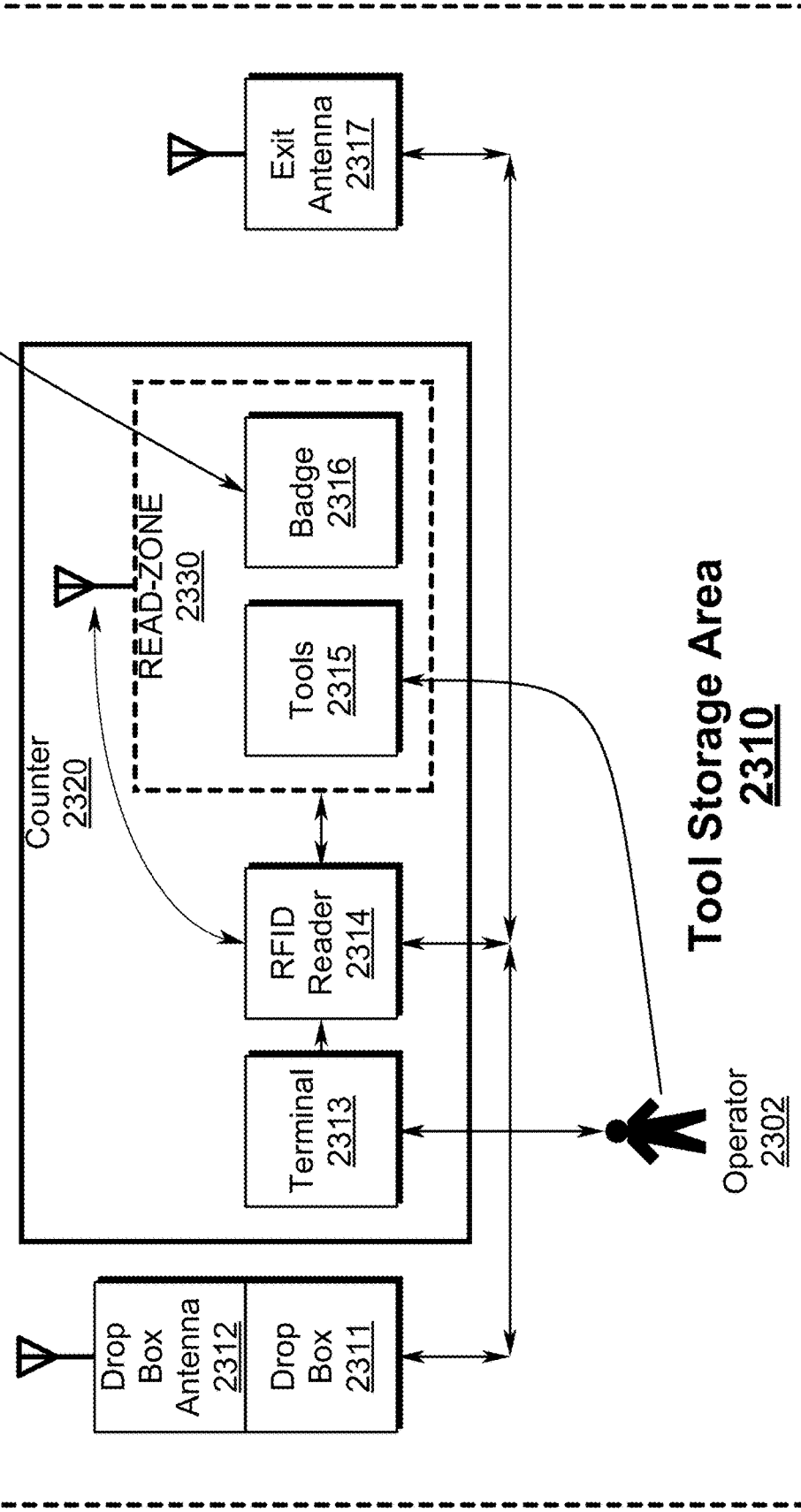
FIG. 23 illustrates a diagram depicting a typical attended check-out operation as implemented in some preferred invention embodiments.

As generally depicted in FIG. 23 (2300), some invention embodiments may be applied in situations where inventory is controlled via an attended check-out procedure. For example, in a tool storage area (2310) application context for a typical tool trailer at a construction site, an employee (2301) and operator (2302) interact as follows to provide for attended tool check-out.

The operator (2302) at a check-out counter (2320) with terminal (2313) connected to RFID fixed mount reader (2314) which also has a flat antenna mounted under the counter (2314) thus creating a (marked) READ-ZONE (2330) on the check-out counter (2320). The operator (2302) would place tools (2315) requested by employee (2301) on the READ-ZONE (2330). Tags are then read and added to the check-out queue.

The employee (2301) would place their RFID badge (2316) on the READ-ZONE (2330). The RFID badge (2316) utilizes a data pattern unique to the tool tags and master area tags.

The operator (2302) "completes" the transaction on the terminal (2313) and items (2315) are removed to the employee (2301) and tool database is updated.

Figure 24:
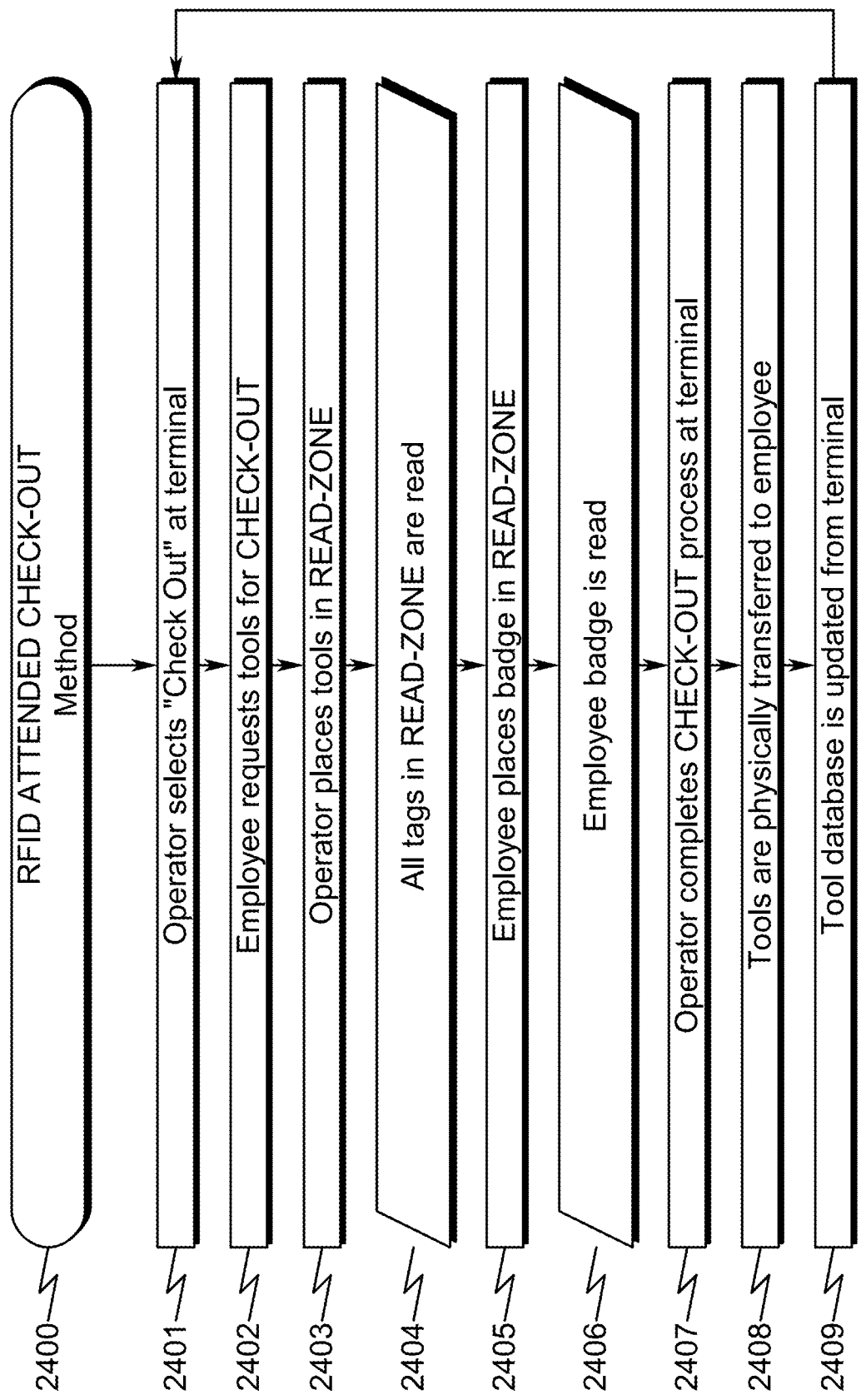
FIG. 24 illustrates a flowchart depicting a typical attended check-out method as implemented in some preferred invention embodiments.

As generally depicted in the flowchart of FIG. 24 (2400), this present invention method may be broadly generalized as an attended check-out method comprising the following steps:
(1) Operator selects "Check Out" at terminal (2401);
(2) Employee requests tools for CHECK-OUT (2402);
(3) Operator places tools in READ-ZONE (2403);
(4) All tags in READ-ZONE are read (2404);
(5) Employee places badge in READ-ZONE (employee cannot check-out tools without badge) (2405);
(6) Employee badge is read (2406);
(7) Operator completes CHECK-OUT transaction process at terminal (2407);
(8) Tools are physically checked out to employee (2408);
(9) Tool database is updated from terminal (2409).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Unattended Check-Out (2500)-(2600)

Figure 25:
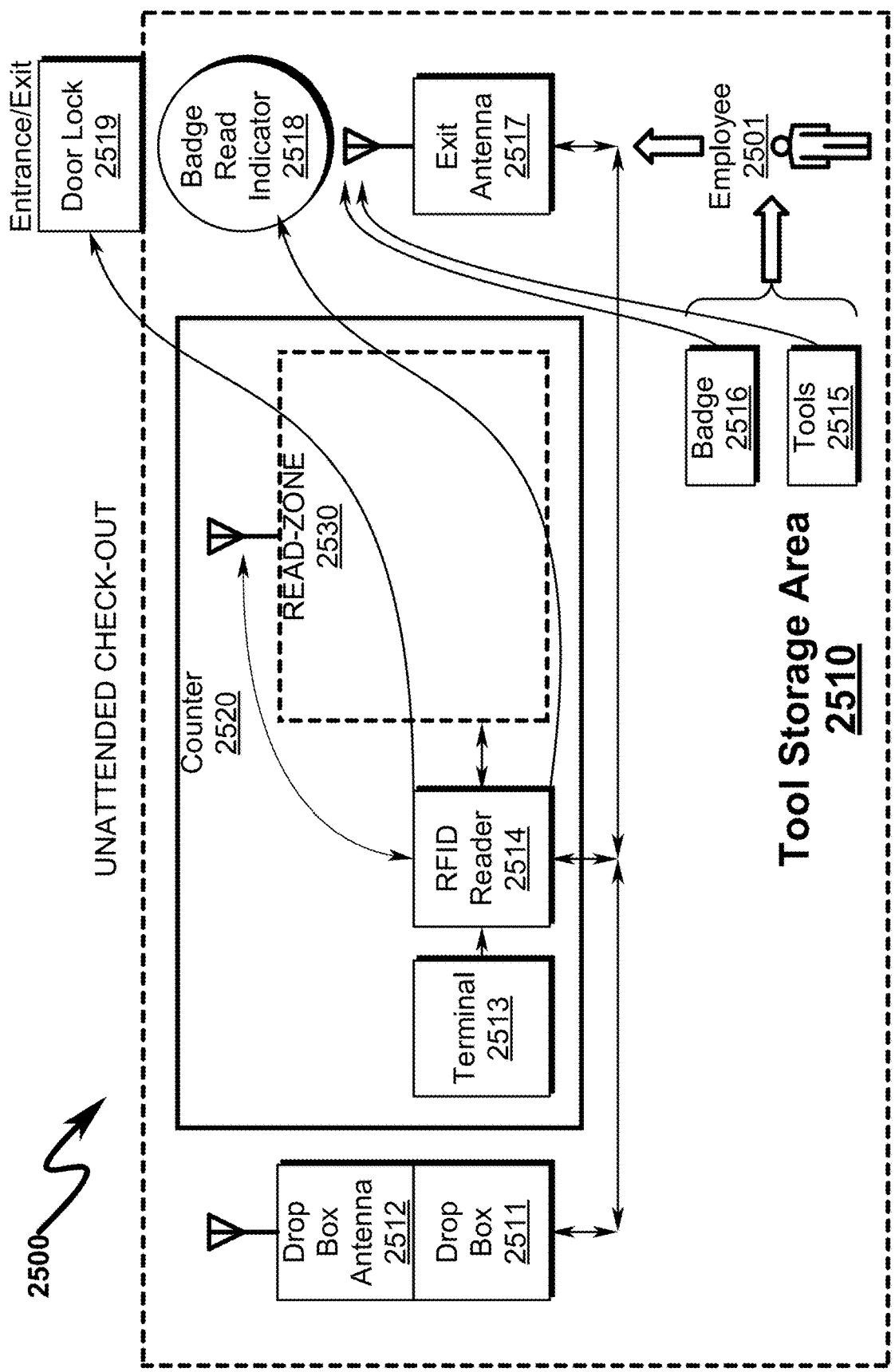
FIG. 25 illustrates a diagram depicting a typical unattended check-out operation as implemented in some preferred invention embodiments.

As generally depicted in FIG. 25 (2500), some invention embodiments may be applied in situations where inventory is controlled via an unattended check-out procedure. For example, in a tool storage area (2510) application context for a typical tool trailer at a construction site, an employee (2501) interacts as follows to provide for unattended tool check-out. The unattended check-out allows for an employee to enter the tool area and pick up tools that he/she needs then exit through the exit antenna doorway. Any tags in this exit doorway will be read and updated as checked out. There may be a light or other alarm to indicate when a badge is read so that the employee can then proceed through the doorway. This could also be accompanied by a door lock also controlled by the software sending a signal to the door lock.

In this situation, a portal reader (2517) would be positioned at a fixed exit from the tool storage area (2510). Any tool tag read (2515) at the portal reader (2517) would be checked out along with the existence of a valid employee badge (2516). Some form of BADGE READ INDICATOR (2518) is activated by the RFID reader (2514) when the employee badge is processed in this situation. A DOOR LOCK (2519) could also be connected to the RFID reader (2514) which could also be unlocked when the employee badge (2516) is read and processed.

Figure 26:
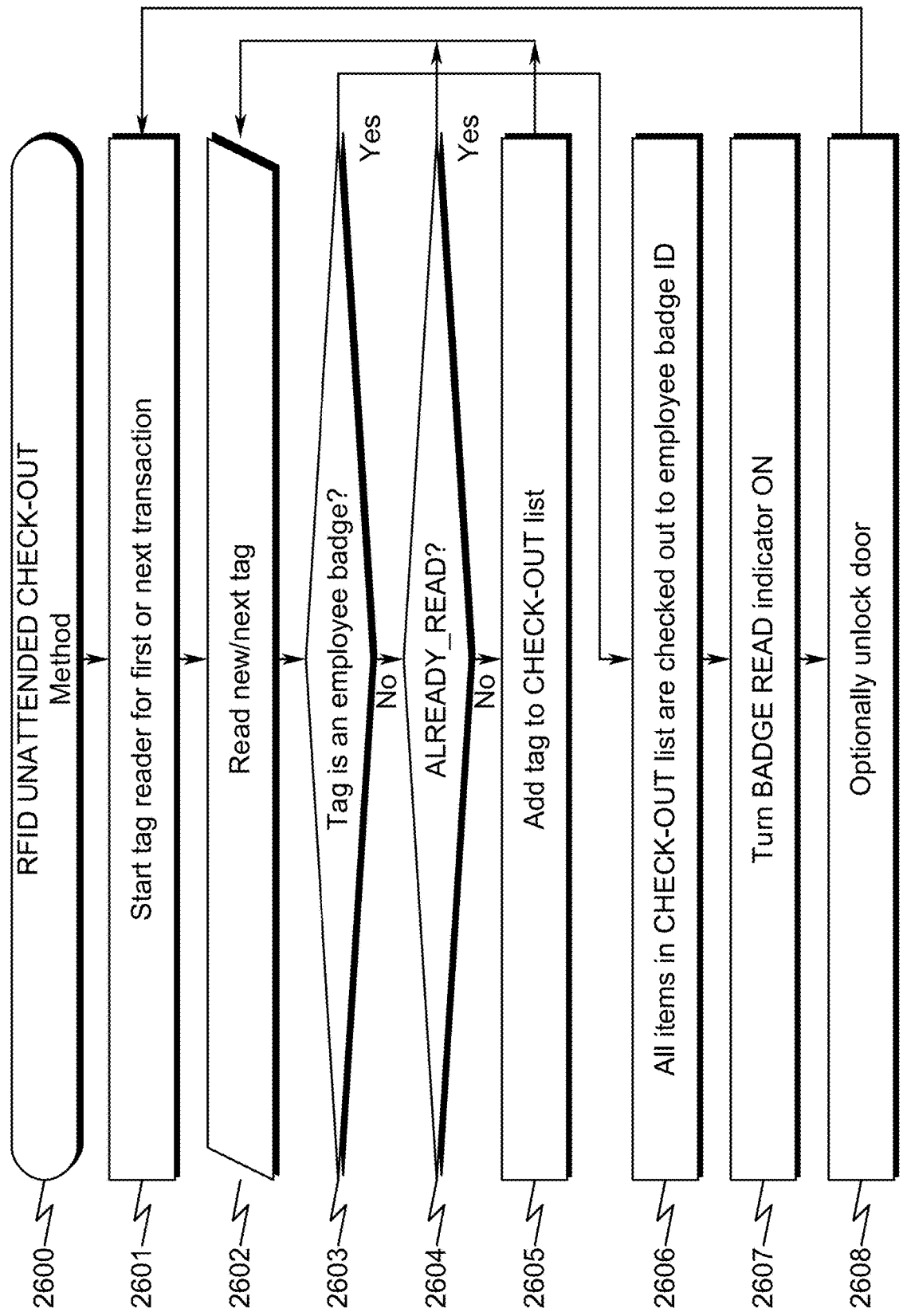
FIG. 26 illustrates a flowchart depicting a typical unattended check-out method as implemented in some preferred invention embodiments.

As generally depicted in the flowchart of FIG. 26 (2600), this present invention method may be broadly generalized as an unattended check-out method comprising the following steps:
(1) Start tag reader for first or next transaction (2601);
(2) Read new/next tag from employee selected tools or badge ID (2602);
(3) Determine if the tag read is an employee badge, and if so, proceed to step (6) (2603);
(4) Determine if the tag is present in the ALREADY_READ list, and if so, proceeding to step (2) (2604);
(5) Add tag to CHECK-OUT list and proceed to step (2) (2605);
(6) All items in CHECK-OUT list are checked out to employee badge ID (2606);
(7) Turn BADGE READ indicator ON (2607); and
(8) Unlock door to allow employee to exit tool storage area and proceed to step (1) (2608).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Attended Check-In (2700)-(2800)

Figure 27:
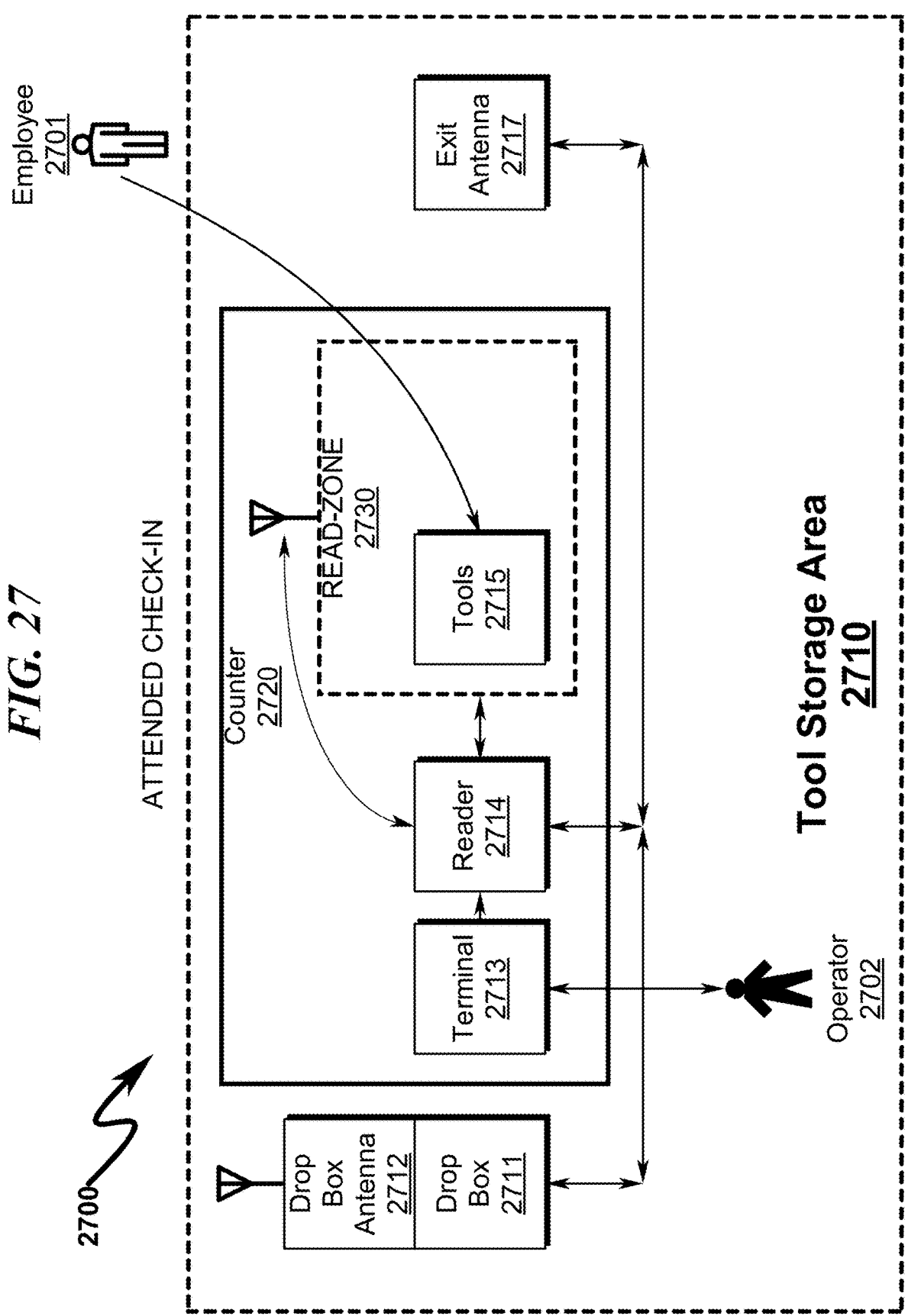
FIG. 27 illustrates a diagram depicting a typical attended check-in operation as implemented in some preferred invention embodiments.

As generally depicted in FIG. 27 (2700), some invention embodiments may be applied in situations where inventory is controlled via an attended check-in procedure. For example, in a tool storage area (2710) application context for a typical tool trailer at a construction site, an employee (2701) and operator (2702) interact as follows to provide for attended tool check-in.

The operator (2702) at a check-in counter (2720) with terminal (2713) connected to RFID fixed mount reader (2714) which also has a flat antenna mounted under the counter (2714) thus creating a (marked) READ-ZONE (2730) on the check-out counter (2720). The operator (2702) would place tools (2715) returned by employee (2301) on the READ-ZONE (2730). Tags are then read and added to the check-in queue.

Figure 28:
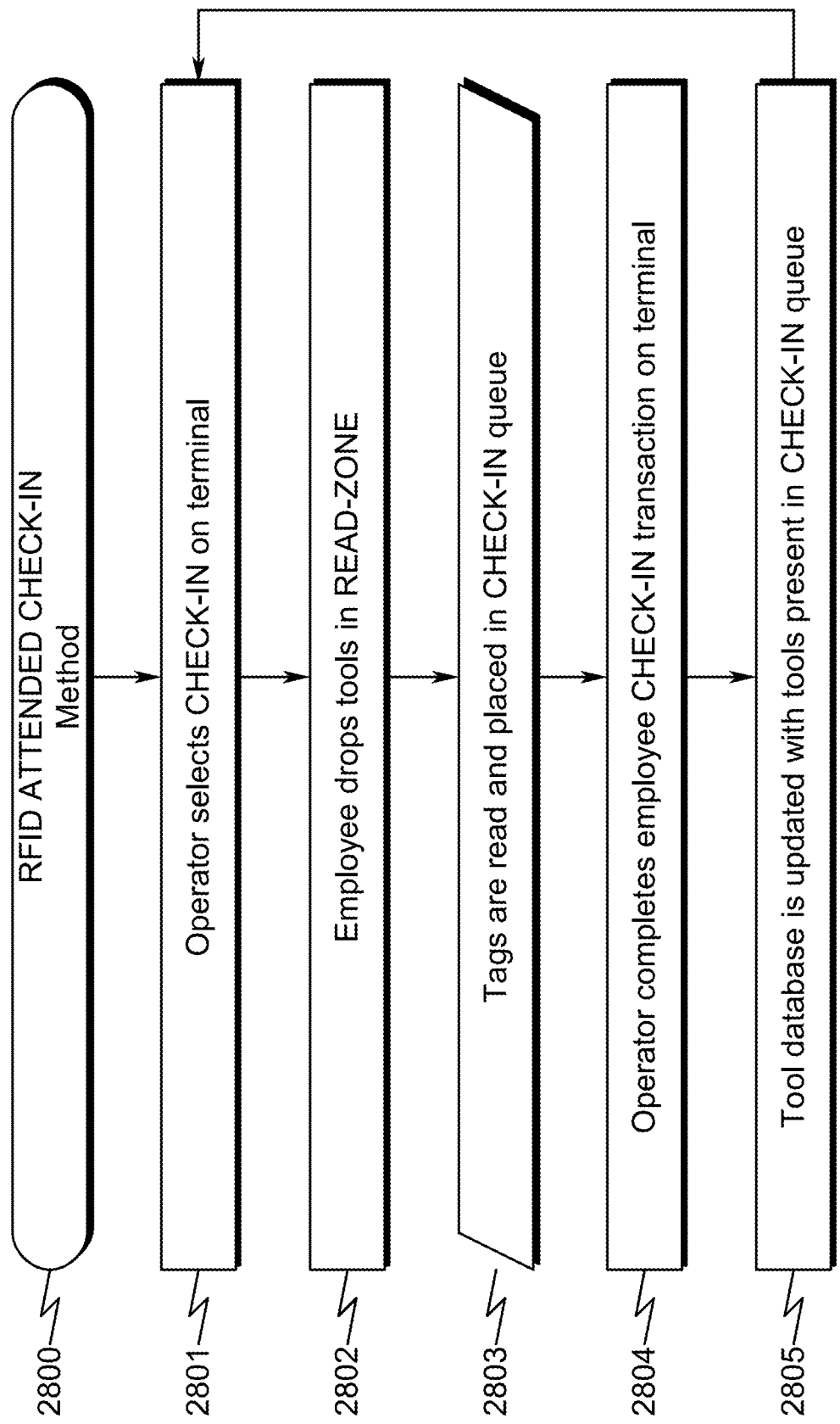
FIG. 28 illustrates a flowchart depicting a typical attended check-in method as implemented in some preferred invention embodiments.

As generally depicted in the flowchart of FIG. 28 (2800), this present invention method may be broadly generalized as an attended check-in method comprising the following steps:
(1) Operator selects CHECK-IN on terminal (2801);
(2) Employee places tools to be checked-in in the READ-ZONE (2802);
(3) Tags are read and placed in CHECK-IN queue (2803);
(4) Operator completes employee CHECK-IN transaction on terminal (2804); and
(5) Tool database is updated with tools present in CHECK-IN queue (2805).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Unattended Check-In (2900)-(3000)

Figure 29:
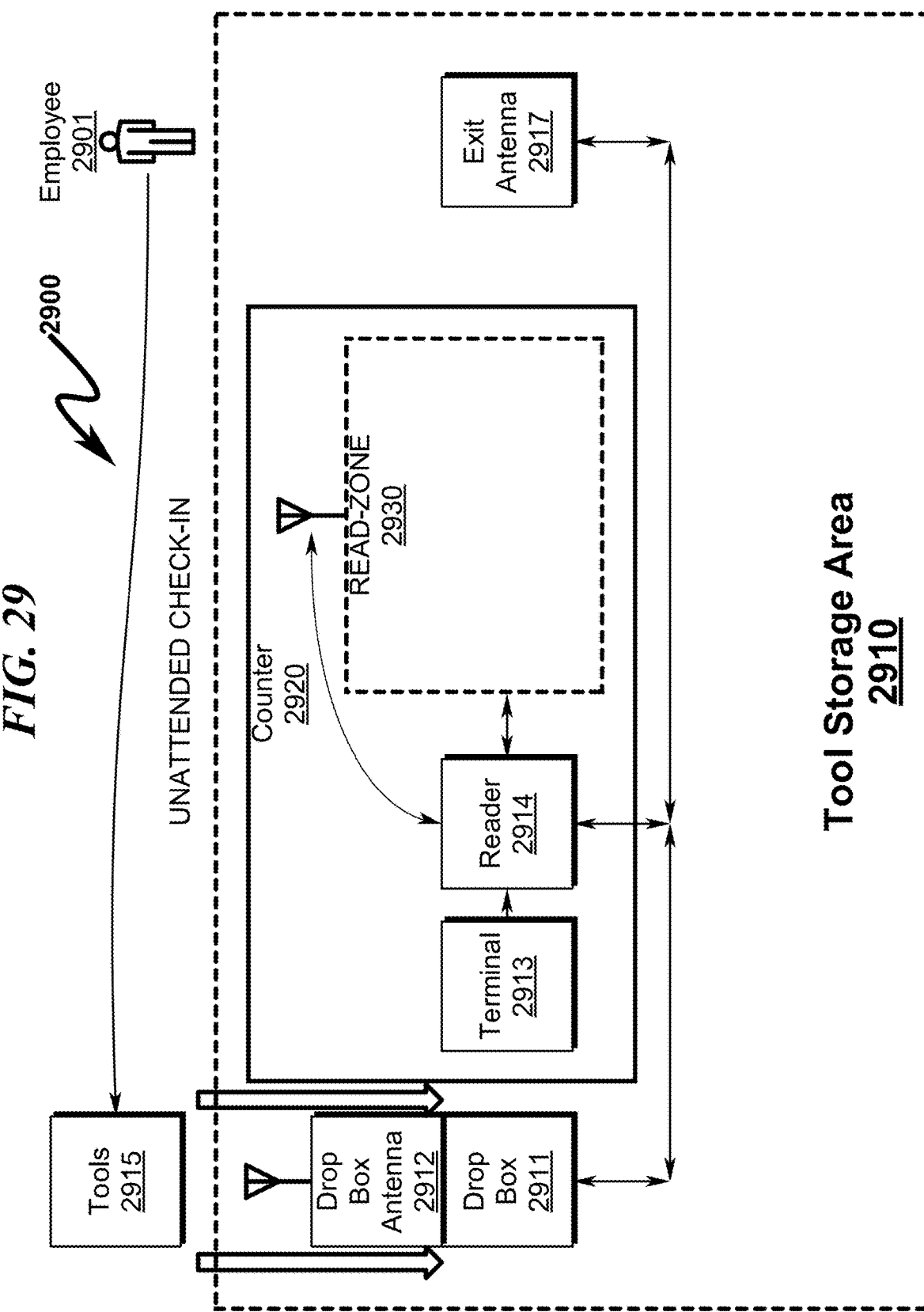
FIG. 29 illustrates a diagram depicting a typical unattended check-in operation as implemented in some preferred invention embodiments.

As generally depicted in FIG. 29 (2900), some invention embodiments may be applied in situations where inventory is controlled via an unattended check-in procedure. For example, in a tool storage area (2910) application context for a typical tool trailer at a construction site, an employee (2901) interacts as follows to provide for unattended tool check-in. The unattended check-in allows for an employee to return tools via a drop-box (2911) and associated drop-box antenna (2912) used by the RFID reader (2914). Any tags in this drop-box (2911) will be read and updated as checked in.

Figure 30:
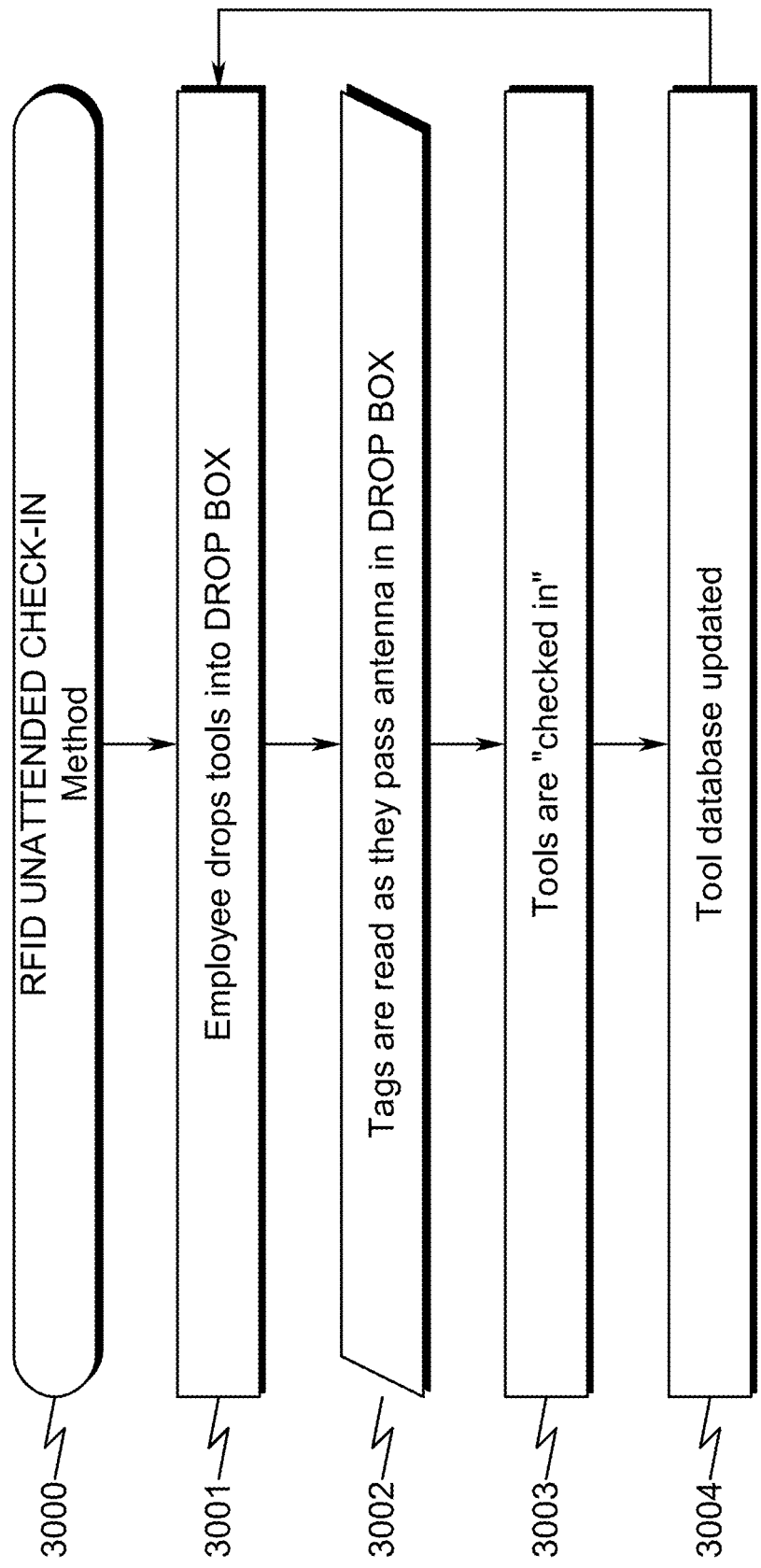
FIG. 30 illustrates a flowchart depicting a typical unattended check-in method as implemented in some preferred invention embodiments.

As generally depicted in the flowchart of FIG. 30 (3000), this present invention method may be broadly generalized as an unattended check-in method comprising the following steps:
(1) Employee drops tools into DROP BOX (3001);
(2) Tags are read as they pass antenna in DROP BOX (3002);
(3) Tools are "checked in" to the CHECK-IN queue (3003); and
(4) Tool database updated with the CHECK-IN queue (3004).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Targeted Proximity Search Method (3100)-(3200)

The present invention anticipates that some preferred embodiments may incorporate a TARGETED PROXIMITY SEARCHING method associated with using a handheld tag reader to find a tool or other item located in the tool/item inventory area. A tool/item number/type would be entered on the handheld tag reader which is then looking for the tag. The reader would be waved around the inventory area thus searching for the tool/item. When the tool/item tag is first read the tag signal strength would be used to enable a type of proximity detector functionality on the RFID reader device and give an audible feedback tone signal allowing the tag reader operator to fine tune their targeted tool search and locate the tool/item in question.

Figure 31:
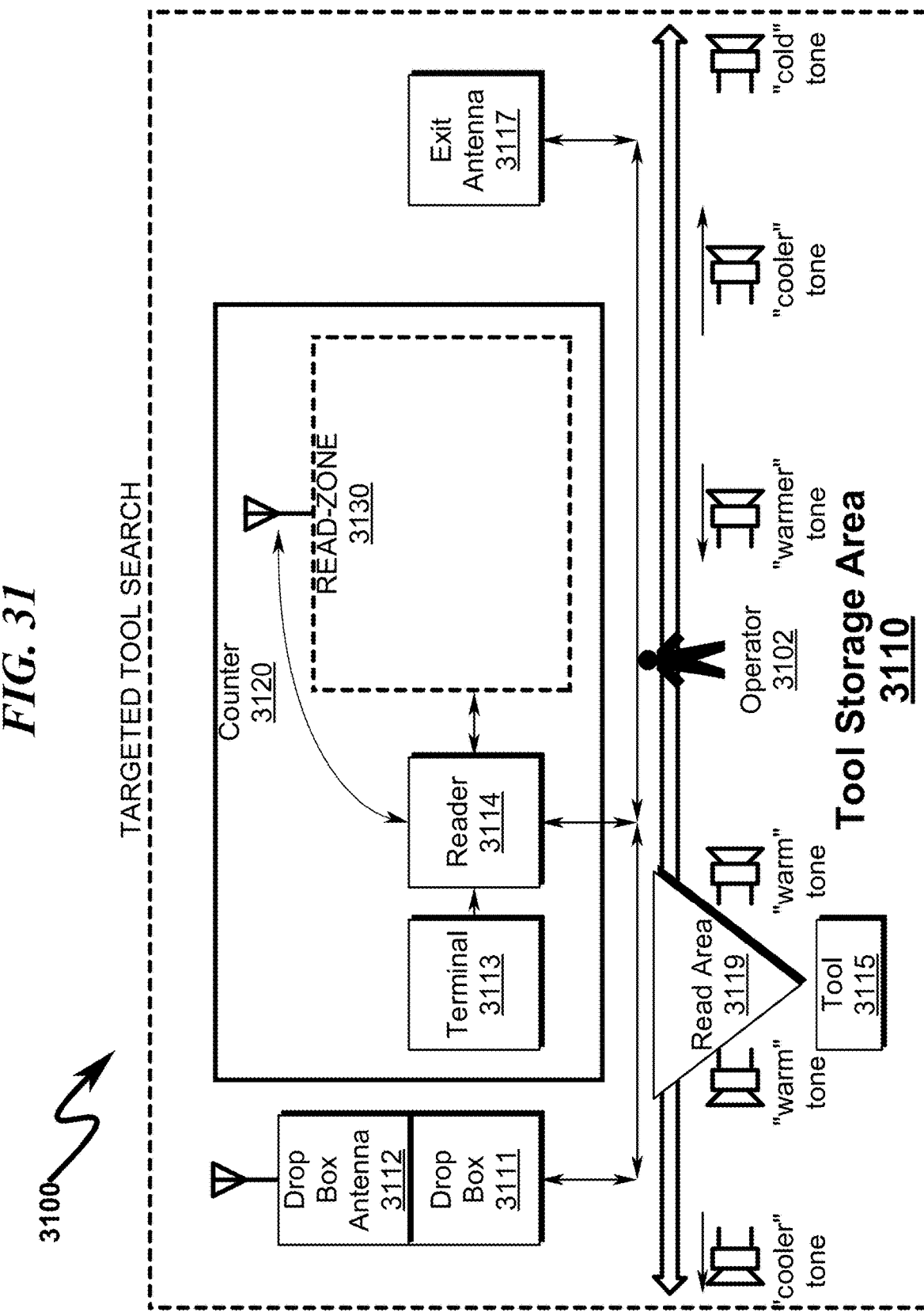
FIG. 31 illustrates a diagram depicting a typical targeted tool search operation as implemented in some preferred invention embodiments.

This method is generally depicted in FIG. 31 (3100) in which the operator (3102) enters tool ID/description on mobile reader device (3114). The mobile reader device (3114) then goes into automatic read mode. The operator (3102) can stop read operations at any time by toggling the search to start/stop mode. When a tool (3115) tag is read, signal strength is assessed and a proximity detection function based on signal strength is used with an audible tone on the reader device (3114) notifying the operator (3102) that the tool was read. The continued movement of the read area (3119) allows the operator (3102) to fine tune his/her search thus changing the audible tone to indicate if the reader (3114) is closer/further away from the tool (3115) being searched.

As generally depicted in the flowchart of FIG. 32 (3200), this present invention method may be broadly generalized as a targeted tool search method comprising the following steps:
(1) Operator enters tool target information for targeted proximity search (part, description, etc.) (3201);
(2) Tag reader device enters READ mode (3202);
(3) Determine if the operator has terminated automatic search mode, and if not, proceeding to step (5) (3203);
(4) Indicate targeted proximity search completed, terminate targeted proximity search operation, and proceed to step (1) (3204)
(5) Tag is read (3205);
(6) Determine if tag read matches the search target, and if not, proceeding to step (2) (3206);
(7) Measure the tag signal strength (3207);
(8) Determine if this is the initial read of this tag, and if so, proceed to step (10) (3208);
(9) Measure the difference in tag signal strength and adjust audible feedback tone output to "warmer" or "cooler" depending on difference in tag signal strength and proceed to step (2) (3209); and
(10) Log initial tag signal strength and start initial tag found audible tone and proceed to step (2) (3210).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Within the context of the above discussion, the terms "warmer", "cooler", "hot", "cold" etc. may be arbitrarily defined on an application specific basis to provide necessary indications that the RFID reader distance to the desired RFID tag is closer or farther away and that the movement of the RFID reader is either moving toward or away from the desired RFID tag.

System Summary

The present invention system may be broadly generalized as a system comprising:
(a) RFID scanner (RFSC);
(b) Master RFID Tag (RFIM);

(c) Area/Cell RFID tags (RFIT);
(d) RFID Tag Database (RFTD);
(e) RFIT Scanned Results Database (RFSR); and
(f) RFID Compute Server (RFCS);
wherein:
the RFSC is configured to interrogate the RFIM and cross reference identification information stored within the RFIM against data retrieved from the RFDB to identify a RFID area/cell (RFAC) in which the RFIM is located;
the RFSC is configured to define a RFIT candidate list (RFCL) of RFIT that should be located within the RFAC based on the RFAC;
the RFSC is configured to interrogate the RFIT and determine an inventory status of the RFIT depending on the RFAC;
the RFSC is configured to categorized the RFIT as READ (if the RFIT is properly within the RFAC and found during a scan) and log the READ categorization in the RFSR;
the RFSC is configured to categorize the RFIT as MISSING (if the RFIT should be located within the selected RFAC but were not scanned) and log the MISSING categorization in the RFSR;
the RFSC is configured to categorize the RFIT as WRONG (if the RFIT was scanned in the RFAC but should be within another RFAC) and log the WRONG categorization in the RFSR;
the RFSC is configured to categorize the RFIT as DIRTY (if the RFIT is not associated with any known RFAC) and log the DIRTY categorization in the RFSR; and
the RFSC is configured to transmit the RFSR to the RFCS;
the RFSC is configured to permit selection of a timer countdown value (TCV) associated with a READ DURATION TIMER (RDT);
the RFSC is configured to initialize countdown timing of the RDT using the TCV as an initial countdown value;
the RFSC is configured to clear an ALREADY_READ tag list (ARL) on the initialization of the RDT and on expiration of the countdown timing of the RDT;
the RFSC is configured to receiving RFID tag data from the RFIT;
the RFSC is configured to process data contents of the RFIT if the RFIT is not present in the ARL and place the RFIT on the ARL; and
the RFSC is configured to reload the RDT with the TCV on expiration of the countdown timing of the RDT.

This general system summary may be augmented by the various elements described herein to produce a wide variety of invention embodiments consistent with this overall design description.

Method Summary

The present invention method may be broadly generalized as a method comprising:
(1) with a RFID scanner (RFSC), interrogating a Master RFID Tag (RFIM) and cross referencing identification information stored within the RFIM against data retrieved from a RFID tag database (RFTD) to identify a RFID area/cell (RFAC) in which the RFIM is located;
(2) with the RFSC, defining an Area/Cell RFID tags (RFIT) candidate list (RFCL) of RFIT that should be located within the RFAC based on the RFAC;
(3) with the RFSC, interrogating the RFIT and determining an inventory status of the RFIT depending on the RFAC;
(4) with the RFSC, categorizing the RFIT as READ (if the RFIT is properly within the RFAC and found during a scan) and logging the READ categorization in a RFIT Scanned Results Database (RFSR);
(5) with the RFSC, categorizing the RFIT as MISSING (if the RFIT should be located within the selected RFAC but were not scanned) and log the MISSING categorization in the RFSR;
(6) with the RFSC, categorizing the RFIT as WRONG (if the RFIT was scanned in the RFAC but should be within another RFAC) and logging the WRONG categorization in the RFSR;
(7) with the RFSC, categorizing the RFIT as DIRTY (if the RFIT is not associated with any known RFAC) and logging the DIRTY categorization in the RFSR; and
(8) with the RFSC, transmitting the RFSR to a RFID Compute Server (RFCS);
(9) with the RFSC, allowing operator selection of a timer countdown value (TCV) associated with a READ DURATION TIMER (RDT);
(10) with the RFSC, initializing countdown timing of the RDT using the TCV as an initial countdown value;
(11) with the RFSC, clearing an ALREADY_READ tag list (ARL) on the initialization of the RDT and on expiration of the countdown timing of the RDT;
(12) with the RFSC, receiving RFID tag data from the RFIT;
(13) with the RFSC, process contents of the RFIT if the RFIT is not present in the ARL and placing the RFIT on the ARL; and
(14) with the RFSC, reloading the RDT with the TCV on expiration of the countdown timing of the RDT.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:
An embodiment wherein the RFIM identifies a database to which subsequent RFIT lookups are to be addressed.
An embodiment wherein the RFSR comprises a DATE field corresponding to the scan date of the RFIT.
An embodiment wherein the RFSR comprises a TIME field corresponding to the scan time of the RFIT.
An embodiment wherein the RFSR comprises MASTER TAG ID field corresponding to the RFID tag identification of the RFIM.
An embodiment wherein the RFSR comprises an ITEM TAG ID field corresponding to the RFID tag identification of the RFIT.

An embodiment wherein the RFSR comprises a FOUND-AT field corresponding to the RFAC in which the RFID was scanned.

An embodiment wherein the RFCS is configured to selectively interrogate the RFSR from the RFSC.

An embodiment wherein the RFSC is configured to only transmit portions of the RFSR to the RFCS that have changed since a previous scan of the RFIT.

An embodiment wherein the RFSC is configured to send an alert to the RFCS on the detection of RFIT having a DIRTY status.

An embodiment wherein the RFSC is configured provide for attended check-out of inventory tagged with a RFIT.

An embodiment wherein the RFSC is configured provide for unattended check-out of inventory tagged with a RFIT.

An embodiment wherein the RFSC is configured provide for attended check-in of inventory tagged with a RFIT.

An embodiment wherein the RFSC is configured provide for unattended check-in of inventory tagged with a RFIT.

An embodiment wherein the RFSC is configured provide for a targeted proximity search of inventory tagged with a RFIT.

One skilled in the art will recognize that other embodiments are possible based on combinations of elements taught within the above invention description.

Invention Claim Summary

While the claimed invention can be described in a variety of ways, a summary of the claimed invention is as follows:

A process by which a person(s) with an RFID enabled device can come into a trailer/room with a plurality of RFID-tagged tools and a master area/cell tag and begin reading all of the tools (After the master area/cell tag is read) in this area/cell thus updating the inventory levels back to a home server which might be an instance of SQL, Webservice, etc.

This is a process by which people can design software/firmware for multiple types of mobile devices with RFID capability to perform a quick, efficient, and complete inventory.

A typical system embodiment requires two types of RFID tags with different functions. The tag IDs must be discernable between a MASTER TAG and ITEM TAG. Also, note that all ITEM TAGS must contain unique tag IDs and master tags should also contain unique tag IDs.

MASTER AREA/CELL TAG—This tag identifies a specific inventory area/cell location which would be a room/trailer and MUST be interrogated first BEFORE an item tag is accepted.

ITEM TAG—This tag identifies a specific item/tool.

To perform the inventory process, a user will enter area/cell and activate a RFID read process.

User will read MASTER TAG which must contain a tag id pattern NOT similar and unique to the item tags.

Item/DIRTY tags are then accepted.

Date and Time stamps MUST be created from device at the time of the tag read and saved in the data record.

For updating purposes, all that is needed is MASTER TAG ID, ITEM TAG ID, Status, Date, Time. Optional field would be FOUND AT for WRONG tags which are in the wrong area/cell.

After a tag is read (or not read), it is interrogated and tag type is determined. There are four different tag status possibilities.

READ—Item was read and is expected in this cell.

MISSING—Item was expected in this area/cell but was not READ.

WRONG—Item was read BUT should not be in this area/cell.

DIRTY—Item was read BUT is not a part of the inventory system.

User can release/reactivate trigger and current inventory reads will be saved/continued on device until completion event by user.

Completion event will send all information to server where the data must be updated sensitive to time of tag reads.

Updates are done in a time sensitive manner along with some rules which will help facilitate multiple devices reading in the same items in the same area cell.

With the inclusion of an estimated inventory window system parameter, updates are processed as follows:

Host system receives new record.

If new record status is a MISSING tag then current tag id record status is read along with date time.

If current record status is READ and if date/time stamp is within the inventory estimate inventory window then the new record with the status of MISSING is ignored BUT date/time stamps may be updated as a keep warm. This system compensates for the fact that when multiple devices are reading the same area/cell, it is possible that one device may read the item tag while the other misses the tag. This simple rule will allow for the one miss/one hit scenario. The assumption is that the item/tool will not physically disappear from the area/cell during the inventory.

If new record status is a READ tag then all fields of this tag are updated.

If new record status is a DIRTY tag then the system may save this record new a different dataset or insert into the current data set with user/system definable default values.

If new record status is a WRONG tag then current record for the tag is updated.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A radio frequency identification (RFID) inventory system/method allowing identification and categorization of radio frequency identification tags (RFIT) has been disclosed. The system/method locates a master RFIT (RFIM) within a selected RFID area/cell (RFAC) using a RFID scanner (RFSC) and uses this RFIM to determine a RFIT candidate list (RFCL) that should be located within the RFAC. This RFCL is then compared against scanned RFIT (RFIS) within the RFAC and the RFIS are then categorized as READ (corresponding to RFIT that are properly within the RFAC and found during the scan), MISSING (corresponding to RFIT that should be located within the selected RFAC but were not scanned), WRONG (corresponding to RFIT that were scanned in the RFAC but should be within another RFAC), DIRTY (RFIT that are not associated with any known RFAC), READ DURATION EXPIRED (RFIT that are read outside a READ DURATION window that forces clearing of an ALREADY_READ tag list), or TARGETED PROXIMITY SEARCH (providing audible feedback on a targeted RFID search). Once RFIS scanning is complete within the selected RFAC, a list of READ, MISSING, WRONG, and DIRTY RFIT are transmitted to an inventory compute server (ICS) to generate an inventory status report (ISR) detailing the RFIT inventory status of the selected RFAC.

CLAIMS INTERPRETATION

The following rules apply when interpreting the CLAIMS of the present invention:
The CLAIM PREAMBLE should be considered as limiting the scope of the claimed invention.
"WHEREIN" clauses should be considered as limiting the scope of the claimed invention.
"WHEREBY" clauses should be considered as limiting the scope of the claimed invention.
"ADAPTED TO" clauses should be considered as limiting the scope of the claimed invention.
"ADAPTED FOR" clauses should be considered as limiting the scope of the claimed invention.
The term "MEANS" specifically invokes the means-plus-function claims limitation recited in 35 U.S.C. § 112(f) and such claim shall be construed to cover the corresponding structure, material, or acts described in the specification and equivalents thereof.
The phrase "MEANS FOR" specifically invokes the means-plus-function claims limitation recited in 35 U.S.C. § 112(f) and such claim shall be construed to cover the corresponding structure, material, or acts described in the specification and equivalents thereof.
The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".
The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").
The claims presented herein are to be interpreted in light of the specification and drawings presented herein with sufficiently narrow scope such as to not preempt any abstract idea.
The claims presented herein are to be interpreted in light of the specification and drawings presented herein with sufficiently narrow scope such as to not preclude every application of any idea.
The claims presented herein are to be interpreted in light of the specification and drawings presented herein with sufficiently narrow scope such as to preclude any basic mental process that could be performed entirely in the human mind.
The claims presented herein are to be interpreted in light of the specification and drawings presented herein with sufficiently narrow scope such as to preclude any process that could be performed entirely by human manual effort.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:
1. A radio frequency identification (RFID) inventory system comprising:
    (a) RFID scanner (RFSC);
    (b) Master RFID Tag (RFIM);
    (c) Area/Cell RFID tags (RFIT);
    (d) RFID Tag Database (RFTD);
    (e) RFIT Scanned Results Database (RFSR); and
    (f) RFID Compute Server (RFCS);
    wherein:
        said RFSC is configured to interrogate said RFIM and cross reference identification information stored within said RFIM against data retrieved from said RFTD to identify a RFID area/cell (RFAC) in which said RFIM is located;
        said RFSC is configured to define a RFIT candidate list (RFCL) of RFIT that should be located within said RFAC based on said RFAC;
        said RFSC is configured to interrogate said RFIT and determine an inventory status of said RFIT depending on said RFAC;
        said RFSC is configured to categorized said RFIT as READ (if the RFIT is properly within the RFAC and found during a scan) and log said READ categorization in said RFSR;
        said RFSC is configured to categorize said RFIT as MISSING (if the RFIT should be located within the selected RFAC but were not scanned) and log said MISSING categorization in said RFSR;

said RFSC is configured to categorize said RFIT as WRONG (if the RFIT was scanned in the RFAC but should be within another RFAC) and log said WRONG categorization in said RFSR;

said RFSC is configured to categorize said RFIT as DIRTY (if the RFIT is not associated with any known RFAC) and log said DIRTY categorization in said RFSR;

said RFSC is configured to transmit said RFSR to said RFCS;

said RFSC is configured to permit selection of a timer countdown value (TCV) associated with a READ DURATION TIMER (RDT);

said RFSC is configured to initialize countdown timing of said RDT using said TCV as an initial countdown value;

said RFSC is configured to clear an ALREADY READ tag list (ARL) on said initialization of said RDT and on expiration of said countdown timing of said RDT;

said RFSC is configured to receiving RFID tag data from said RFIT;

said RFSC is configured to process data contents of said RFIT if said RFIT is not present in said ARL and place said RFIT on said ARL; and said RFSC is configured to reload said RDT with said TCV on expiration of said countdown timing of said RDT.

2. The RFID inventory system of claim 1 wherein said RFIM identifies a database to which subsequent RFIT lookups are to be addressed.

3. The RFID inventory system of claim 1 wherein said RFSR comprises a DATE field corresponding to the scan date of said RFIT.

4. The RFID inventory system of claim 1 wherein said RFSR comprises a TIME field corresponding to the scan time of said RFIT.

5. The RFID inventory system of claim 1 wherein said RFSR comprises a MASTER TAG ID field corresponding to the RFID tag identification of said RFIM.

6. The RFID inventory system of claim 1 wherein said RFSR comprises an ITEM TAG ID field corresponding to the RFID tag identification of said RFIT.

7. The RFID inventory system of claim 1 wherein said RFSR comprises a FOUND-AT field corresponding to the RFAC in which said RFID was scanned.

8. The RFID inventory system of claim 1 wherein said RFCS is configured to selectively interrogate said RFSR from said RFSC.

9. The RFID inventory system of claim 1 wherein said RFSC is configured to only transmit portions of said RFSR to said RFCS that have changed since a previous scan of said RFIT.

10. The RFID inventory system of claim 1 wherein said RFSC is configured to send an alert to said RFCS on the detection of RFIT having a DIRTY status.

11. A radio frequency identification (RFID) inventory method comprising:

(1) with a RFID scanner (RFSC), interrogating a Master RFID Tag (RFIM) and cross referencing identification information stored within said RFIM against data retrieved from a RFID Tag Database (RFTD) to identify a RFID area/cell (RFAC) in which said RFIM is located;

(2) with said RFSC, defining an Area/Cell RFID tags (RFIT) candidate list (RFCL) of RFIT that should be located within said RFAC based on said RFAC;

(3) with said RFSC, interrogating said RFIT and determining an inventory status of said RFIT depending on said RFAC;

(4) with said RFSC, categorizing said RFIT as READ (if the RFIT is properly within the RFAC and found during a scan) and logging said READ categorization in a RFIT Scanned Results Database (RFSR);

(5) with said RFSC, categorizing said RFIT as MISSING (if the RFIT should be located within the selected RFAC but were not scanned) and log said MISSING categorization in said RFSR;

(6) with said RFSC, categorizing said RFIT as WRONG (if the RFIT was scanned in the RFAC but should be within another RFAC) and logging said WRONG categorization in said RFSR;

(7) with said RFSC, categorizing said RFIT as DIRTY (if the RFIT is not associated with any known RFAC) and logging said DIRTY categorization in said RFSR;

(8) with said RFSC, transmitting said RFSR to a RFID Compute Server (RFCS);

(9) with said RFSC, allowing operator selection of a timer countdown value (TCV) associated with a READ DURATION TIMER (RDT);

(10) with said RFSC, initializing countdown timing of said RDT using said TCV as an initial countdown value;

(11) with said RFSC, clearing an ALREADY READ tag list (ARL) on said initialization of said RDT and on expiration of said countdown timing of said RDT;

(12) with said RFSC, receiving RFID tag data from said RFIT;

(13) with said RFSC, process contents of said RFIT if said RFIT is not present in said ARL and placing said RFIT on said ARL; and

(14) with said RFSC, reloading said RDT with said TCV on expiration of said countdown timing of said RDT.

12. The RFID inventory method of claim 11 wherein said RFIM identifies a database to which subsequent RFIT lookups are to be addressed.

13. The RFID inventory method of claim 11 wherein said RFSR comprises a DATE field corresponding to the scan date of said RFIT.

14. The RFID inventory method of claim 11 wherein said RFSR comprises a TIME field corresponding to the scan time of said RFIT.

15. The RFID inventory method of claim 11 wherein said RFSR comprises a MASTER TAG ID field corresponding to the RFID tag identification of said RFIM.

16. The RFID inventory method of claim 11 wherein said RFSR comprises an ITEM TAG ID field corresponding to the RFID tag identification of said RFIT.

17. The RFID inventory method of claim 11 wherein said RFSR comprises a FOUND-AT field corresponding to the RFAC in which said RFID was scanned.

18. The RFID inventory method of claim 11 wherein said RFCS is configured to selectively interrogate said RFSR from said RFSC.

19. The RFID inventory method of claim 11 wherein said RFSC is configured to only transmit portions of said RFSR to said RFCS that have changed since a previous scan of said RFIT.

20. The RFID inventory method of claim 11 wherein said RFSC is configured to send an alert to said RFCS on the detection of RFIT having a DIRTY status.

\* \* \* \* \*